(12) United States Patent
Hirata et al.

(10) Patent No.: US 8,493,819 B2
(45) Date of Patent: Jul. 23, 2013

(54) NEAR-FIELD LIGHT GENERATING ELEMENT, NEAR-FIELD LIGHT HEAD, AND INFORMATION RECORDING AND REPRODUCING DEVICE

(75) Inventors: Masakazu Hirata, Chiba (JP); Norio Chiba, Chiba (JP); Manabu Oumi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 13/414,789

(22) Filed: Mar. 8, 2012

(65) Prior Publication Data

US 2012/0230170 A1 Sep. 13, 2012

(30) Foreign Application Priority Data

Mar. 11, 2011 (JP) ................................. 2011-054217
Dec. 26, 2011 (JP) ................................. 2011-283629

(51) Int. Cl.
*G11B 11/00* (2006.01)
(52) U.S. Cl.
USPC ................................... 369/13.33; 369/13.13
(58) Field of Classification Search
USPC ........ 369/13.33, 13.2, 13.24, 13.133; 360/59, 360/75
See application file for complete search history.

(56) References Cited

U.S. PATENT DOCUMENTS

| 2010/0046111 | A1* | 2/2010 | Hirata et al. | .................... 360/75 |
| 2010/0061199 | A1* | 3/2010 | Hirara et al. | ............... 369/13.24 |
| 2011/0141861 | A1* | 6/2011 | Hirata et al. | ............... 369/13.33 |
| 2011/0188356 | A1* | 8/2011 | Hirata et al. | ............... 369/13.33 |
| 2011/0216634 | A1* | 9/2011 | Chou et al. | .................. 369/13.24 |

FOREIGN PATENT DOCUMENTS

| JP | 2008152897 | 7/2008 |
| JP | 2010108584 | 5/2010 |
| JP | 2011141941 | 7/2011 |

* cited by examiner

*Primary Examiner* — Thang Tran
(74) *Attorney, Agent, or Firm* — Adams & Wilks

(57) ABSTRACT

A metal film is included which is placed between a core and a cladding, propagates a laser beam along an interface between the core and the cladding, and generates a near-field light from the laser beam. The metal film has a base portion placed on one side surface of the core along a propagation direction of the laser beam facing from one end side toward the other end side, and an extending portion extended from the other end side of the base portion to the other end side in the propagation direction rather than the core. The other end side of the extending portion is exposed to the outside, and is formed with a top portion projected toward the core side when viewed from the propagation direction.

10 Claims, 32 Drawing Sheets

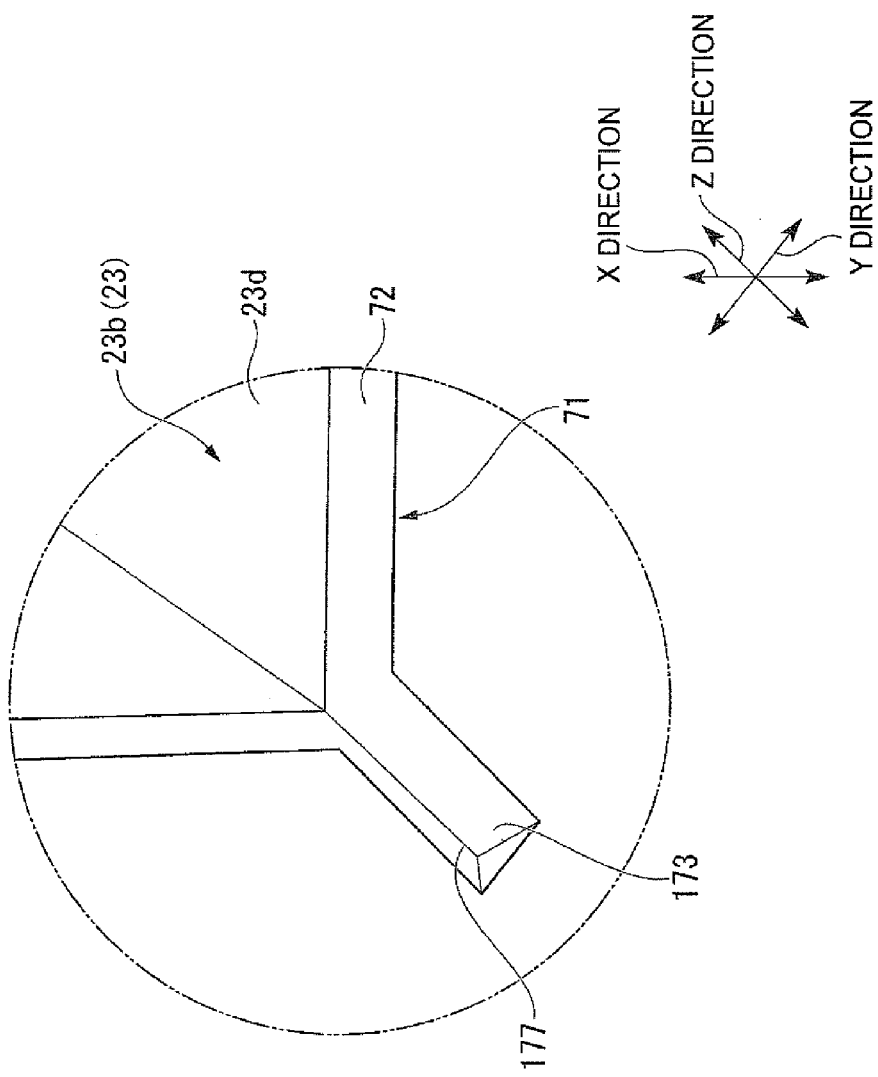

FIG. 28
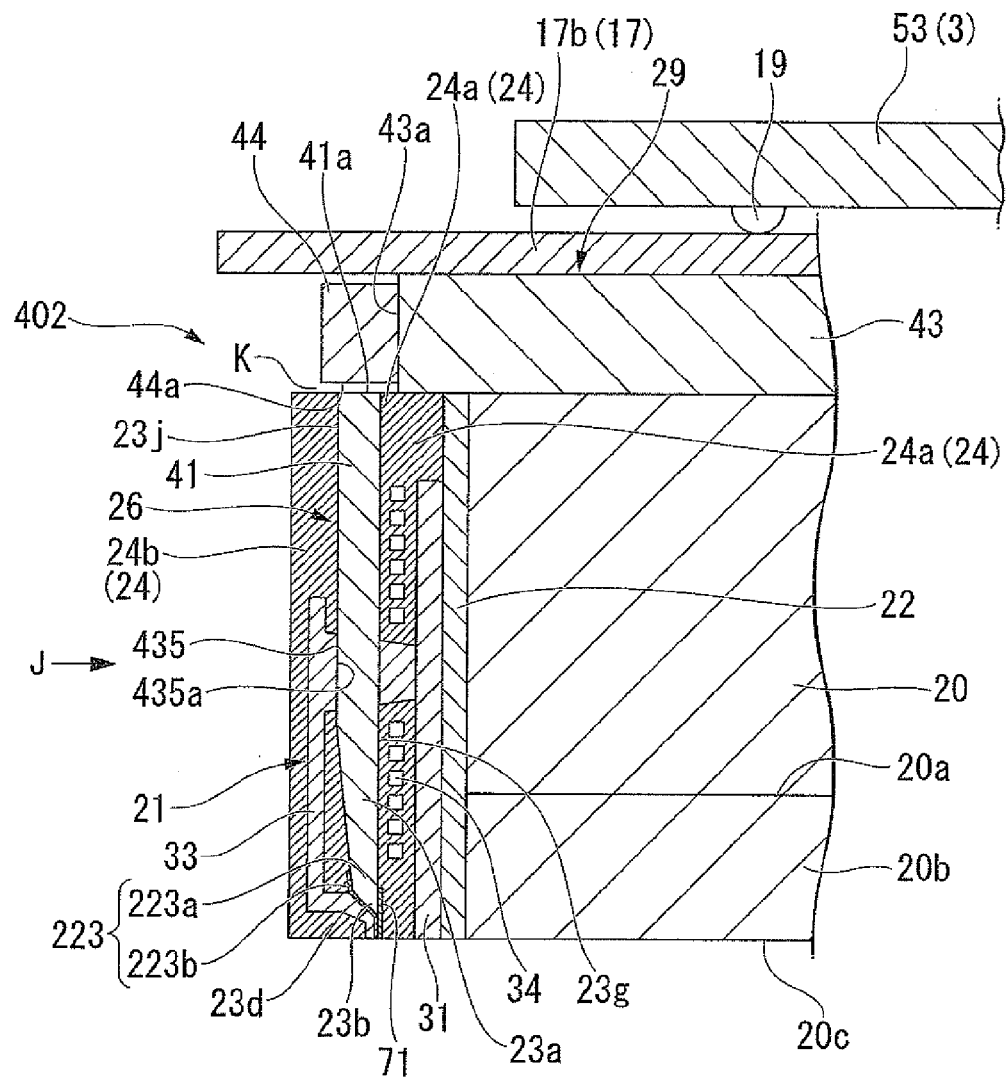
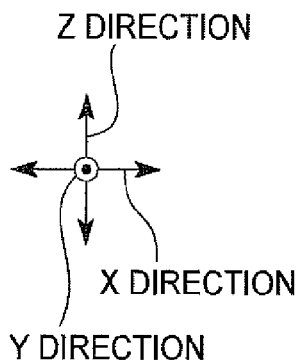

FIG. 30
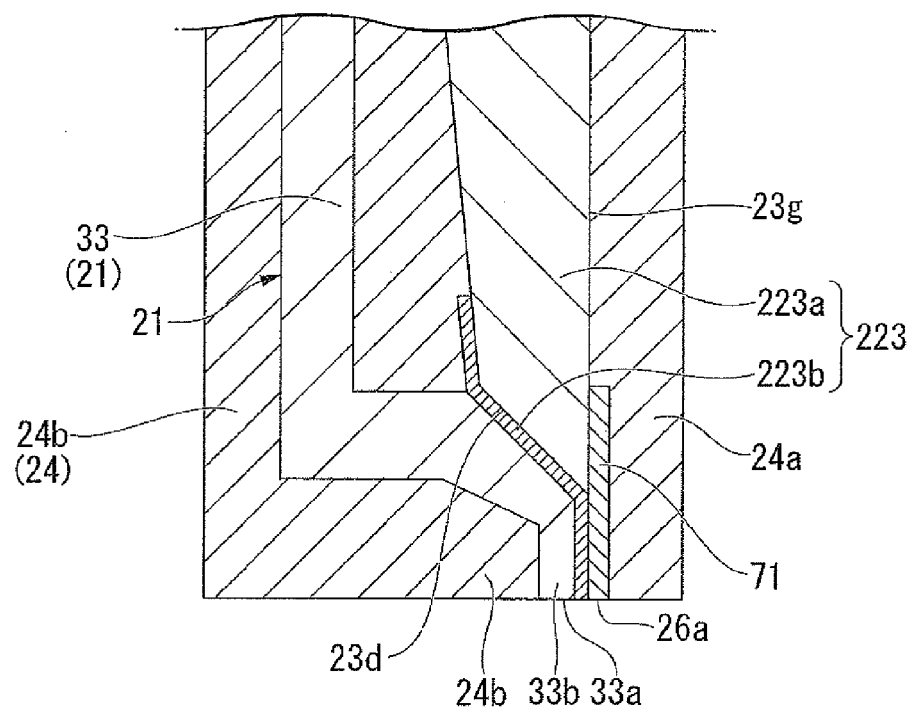
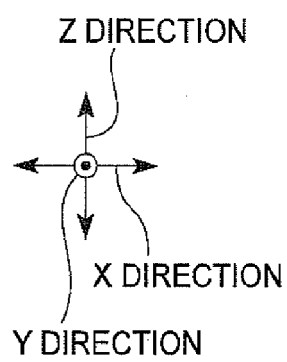

NEAR-FIELD LIGHT GENERATING ELEMENT, NEAR-FIELD LIGHT HEAD, AND INFORMATION RECORDING AND REPRODUCING DEVICE

BACKGROUND OF THE INVENTION

1. Field of the Invention

The present invention relates to a near-field light generating element that records and reproduces a variety of information on a magnetic recording medium using a near-field light with focused light flux, a near-field light head, and an information recording and reproducing device.

2. Background Art

In recent years, along with an increase in capacity of a hard disk or the like in computer equipment, the recording density of information in a single recording surface has increased. For example, in order to increase the recording capacity of a magnetic disk per unit area, there is a need to increase the surface recording density. Incidentally, as the recording density increases, the recording area occupied per bit on the recording medium is reduced. When the bit size is reduced, energy held by one bit of information comes close to the heat energy of room temperature, whereby there is a problem of thermal demagnetization in which the recorded information is reversed or disappears owing to thermal fluctuations or the like.

Although the in-plane recording method generally used is a method of recording the magnetism so that a direction of magnetization faces the in-plane direction of the recording medium, in this method, the recording information is easily lost due to the thermal demagnetization mentioned above. Thus, in order to solve this disadvantage, in recent years, a perpendicular recording method has been adopted in which a magnetization signal is recorded in a direction perpendicular to the recording medium. This method is to record the magnetic information using the principle of causing a single magnetic pole to approach the recording medium. According to this method, the recording magnetic field faces a direction that is substantially perpendicular to a recording film. Since it is difficult to form a loop with N-pole and S-pole within the recording film surface, information recorded in the perpendicular magnetic field is easily maintained energetically stably. For that reason, the perpendicular recording method becomes resistant to the thermal demagnetization compared to the in-plane recording method.

However, recent recording media require further increasing high densities in response to the needs for performing the recording and reproducing of larger amounts and higher densities of information, or the like. For that reason, in order to suppress the influence between the adjacent magnetic domains or the thermal fluctuations to the minimum, recording media having strong coercive force have begun to be adopted. For that reason, even in the perpendicular recording method mentioned above, it is difficult to record information on the recording medium.

Thus, in order to solve the disadvantage mentioned above, a hybrid magnetic recording type recording and reproducing head is provided in which the magnetic domain is locally heated using a spot light with focused light or near-field light to temporarily lower the coercive force, thereby performing the writing onto the recording medium in the meanwhile.

Among such recording and reproducing heads, a recording and reproducing head (a near-field light head) using the near-field light mainly includes a slider, a recording element having a main magnetic pole and an return pole that are placed on the slider, a near-field light generating element that generates the near-field light from the irradiated laser beam, a laser beam source that irradiates a laser beam toward the near-field light generating element, and an optical waveguide that guides the laser beam generated from the laser beam source to the near-field light generating element (for example, see JP-A-2008-152897). The near-field light generating element has a core that propagates laser beam while reflecting the same, a light flux propagation element having a cladding that comes into close contact with the core and seals the core, and a metal film that is placed between the core and the cladding to generate the near-field light from the laser beam. The core is drawn so that the cross-sectional area perpendicular to the propagation direction of laser beam facing from one end side (a light incident side) to the other end side (a light emission side) is gradually reduced, and is configured so as to propagate the laser beam toward the other end side while focusing the same. Moreover, the metal film mentioned above is placed on a side surface of the other end side in the core.

In the case of using the recording and reproducing head configured in this manner, a variety of information is recorded on the recording medium by generating the near-field light and applying the recording magnetic field. That is, a laser beam emitted from the laser beam source is incident to the light flux propagation element via the optical waveguide. Moreover, the laser beam incident to the light flux propagation element propagates through the cores and reaches the metal film. Then, since free electrons within the metal film are uniformly vibrated by the laser beam, Plasmon is excited and generates the near-field light on the other end side of the core in the state of being localized. As a result, the magnetic recording layer of the magnetic recording medium is locally heated by the near-field light and coercive force is temporarily lowered.

Furthermore, by providing the driving electric current to the recording element simultaneously with the irradiation of the laser beam mentioned above, the recording magnetic field is locally applied to the magnetic recording layer of the magnetic recording medium adjacent to the tip of the main magnetic pole. As a result, it is possible to record a variety of information on the magnetic recording layer in which the coercive force is temporarily lowered. That is, by the cooperation of the near-field light with magnetic field, the recording to the magnetic recording medium can be performed.

SUMMARY OF THE INVENTION

However, in order to promote new high density of the recording medium, there is a need to reduce the spot size of the near-field light, and more locally heat the magnetic recording layer of the magnetic recording medium, thereby suppressing the influence of the thermal fluctuation phenomenon mentioned above or the like. In order to reduce the spot size of the near-field light, it is conceivable to reduce the width of the metal film (a width of an interface between the metal film and the core when viewed from the propagation direction of the laser beam).

However, since the metal film (and the core) has very minute patterns (the respective sizes are about tens of nm), there is a limit to promote a further miniaturization after performing each of the positioning.

Thus, the present invention was made in view of such a situation, and an object thereof is to provide a near-field light generating element which can reduce a spot size of a near-field light, a near-field light head, and an information recording and reproducing device.

The present invention provides means as below so as to solve the problems mentioned above.

According to the present invention, there is provided a near-field light generating element which propagates the light flux introduced to one end side while focusing the light flux toward the other end side, and emits the near-field light to the outside after generating the near-field light from the light flux, the element having a first core that propagates the light flux toward the other end side; and a near-field light generating portion which is placed along a propagation direction of the light flux from the one end side toward the other end side in the first core, and generates the near-field light from the light flux, wherein the near-field light generating portion has a base portion placed on one side surface of the first core along the propagation direction, and an extending portion extended from the base portion toward the other end side along the propagation direction rather than the first core, the other end side of the extending portion is exposed to the outside, and has a top portion projected toward a direction intersecting to the plane direction of the one side surface of the first core, and wherein an end surface of the first core situated at the other end side is inclined so that an angle formed between the end surface and the one side surface becomes an acute angle.

According to the configuration, the light flux propagated in the first core is incident to the near-field light generating portion, whereby the surface Plasmon is excited in the near-field light generating portion. The excited surface Plasmon is propagated toward the other end side on the near-field light generating portion. Moreover, when the surface Plasmon propagated on the near-field light generating portion is propagated up to the extending portion, the surface Plasmon becomes the near-field light generating portion having strong light intensity in the top portion, and leaks to the outside.

In this manner, by forming the top portion in the extending portion, it is possible to generate the near-field light generating portion having a spot size narrower than a width of an interface between the extending portion and the first core when viewed from the propagation direction of the light flux.

In addition, since the angle formed between the end surface situated at the other side in the first core and the one side surface is inclined so as to become an acute angle, the light flux incident to the end surface is reflected so that the introduction direction thereof faces the near-field light generating element. As a result, for example, it is possible to suppress the light flux leaking outward from the end surface situated at the other end side of the first core, compared to a case where the end surface situated at the other end side of the first core is formed on a flat surface perpendicular to the one side surface of the first core or the like. That is, since the light flux propagated in the first core is effectively incident to the near-field light generating portion, it is possible to ensure the quantity of light incident to the near-field light generating portion and improve the generation efficiency of the near-field light.

The near-field light generating element may include a second core which covers the first core at the opposite side of the near-field light generating portion with respect to the first core, an outer end portion of the second core being situated at the outside of that of the base portion in the extending direction of an interface between the second core and the base portion when viewed from the propagation direction.

According to the configuration, since the outer end portion in the second core is situated at the outside of the outer end portion of the base portion, a width of one side surface of the entire core including the first core and the second core is formed so as to be wider than the width of the near-field light generating portion. For that reason, by suppressing a decline in propagation efficiency of the light flux propagated in the first core and the second core, a reduction in spot size of the near-field light can be promoted. As a result, by ensuring the amount of light, the spot size of the near-field light can be reduced.

Furthermore, the second core may have a refractive index smaller than that of the first core.

According to the configuration, since the light flux propagated through the first core and the second core can be gradually focused toward the center (the first core), the propagation efficiency of the light flux can be improved.

Furthermore, a third core having a refractive index smaller than that of the first core may be provided between the one side surface of the first core and the near-field light generating portion.

According to the configuration, it is possible to realize a so-called automatic arrangement in which the first core, the third core having the refractive index smaller than that of the first core, and the near-field light generating portion are sequentially placed. In this manner, in the near-field light generating device using the automatic arrangement, since the third core having the refractive index smaller than that of the first core acts as a buffering portion between the first core and the near-field light generating portion, it is possible to excite the surface Plasmon in the near-field light generating portion without greatly affecting the wave number of the light flux propagated though the first core.

Furthermore, a light shielding film may be formed at the opposite side of the near-field light generating portion with respect to the first core.

According to the configuration, by forming the light shielding film at the opposite side of the near-field light generating portion to the first core, leaking of the light flux incident to the first core to the outside is suppressed, and the light flux is propagated while being reflected by the interface between the light shielding film and the first core. As a result, it is possible to cause the light flux to effectively be incident to the near-field light generating portion, whereby the generation efficiency of the near-field light can be improved.

Furthermore, the top portion may be projected toward the first core side when viewed from the propagation direction.

According to the configuration, when the light flux propagated through the first core is incident to the near-field light generating portion, the surface Plasmon is excited on the surface of the first core side in the near-field light generating portion. As a result, the excited surface Plasmon is propagated on the near-field light generating portion, it is possible to generate the near-field light having a strong light intensity in the top portion.

Furthermore, the near-field light generating element may include a cladding which covers the near-field light generating portion at the opposite side of the first core with respect to the near-field light generating portion and has a refractive index smaller than that of the first core, the top portion being projected toward the cladding side when viewed from the propagation direction.

According to the configuration, it is possible to realize a so-called Kretschmann arrangement in which the first core, the near-field light generating portion, and the cladding having the refractive index smaller than that of the first core in this order. In this manner, in the near-field light generating element using the Kretschmann arrangement, when the light flux propagated through the first core is incident to the near-field light generating portion, the surface Plasmon is excited on the surface of the cladding side in the near-field light generating portion. As a result, the excited surface Plasmon is propagated on the near-field light generating portion, whereby it is possible to generate the near-field light having strong light intensity in the top portion.

Furthermore, according to the present invention, there is provided a near-field light head which heats a magnetic recording medium rotating in a certain direction and causes a magnetization inversion by applying a recording magnetic field to the magnetic recording medium to record information, the head including a slider placed opposite to the surface of the magnetic recording medium, a recording element which is placed at a tip side of the slider and has a main magnetic pole and an return pole generating the recording magnetic field, the near-field light generating element of the present invention which is fixed adjacently to the recording element in the state of causing the other end side to face the magnetic recording medium side, and light flux introduction device which is fixed to the slider to introduce the light flux from the one end side into the first core.

According to the configuration, since the near-field light head includes the near-field light generating element of the present invention, it is possible to suppress the influence of the thermal fluctuation phenomenon or the like mentioned above and perform the stable recording. Thus, it is possible to increase reliability of the writing of the near-field light head itself can be increased, whereby the high quality can be promoted.

Furthermore, the main magnetic pole may be formed of a material having light shielding property and may be placed at the opposite side of the near-field light generating portion with respect to the first core.

According to the configuration, by forming the main magnetic pole by a material having light shielding property, it is possible to suppress the light flux incident to the first core leaking to the cladding side without separately providing a light shielding film. For that reason, it is possible to promote a reduction in manufacturing costs and an improvement in manufacturing efficiency.

In addition, since the near-field light generating element and the main magnetic pole can be as close as possible, it is possible to generate the near-field light generated in the near-field light generating portion and magnetic field by the main magnetic pole in a state as close as possible. As a result, it is possible to smoothly and accurately perform the recording on the magnetic recording medium.

Furthermore, according to the present invention, there is provided an information recording and reproducing device includes the near-field light head of the present invention, a beam which can be moved in a direction parallel to the surface of the magnetic recording medium and supports the near-field light head at a tip side thereof in a state of being freely rotatable around two axes parallel and perpendicular to each other to the surface of the magnetic recording medium, a light source which causes the light flux to be incident to the light flux introduction device, an actuator which supports a proximal end side of the beam and moves the beam toward a direction parallel to the surface of the magnetic recording medium, a rotation driving portion which rotates the magnetic recording medium in the certain direction, and a control portion which controls operations of the recording element and the light source.

According to the configuration, since the information recording and reproducing device includes the near-field light head according to the present invention, the reliability of the wiring can be increased and the high quality can be promoted.

According to the near-field light generating element according to the present invention, the spot size of the near-field light can be reduced.

According to the near-field light head and the information recording and reproducing device according to the present invention, it is possible to suppress the influence of the thermal fluctuation phenomenon or the like mentioned above and perform the stable recording. Thus, the reliability of the writing is high, and it is possible to cope with high density recording, whereby high quality can be promoted.

BRIEF DESCRIPTION OF THE DRAWINGS

FIG. 16A is a cross-sectional view along a line H-H of FIG. 14C, and FIG. 16B is a cross-sectional view along a line I-I of FIG. 14C.

FIG. 18 is an enlarged view that shows another configuration of the embodiment corresponding to an E portion of FIG. 7.

FIG. 28 is an enlarged cross-sectional view of the side surface of the outflow end side of the recording and reproducing head in a fourth embodiment.

FIG. 30 is an enlarged cross-sectional view of the front side of the recording and reproducing head.

DETAILED DESCRIPTION OF THE INVENTION

Next, an embodiment of the present invention will be described based on the drawings.

Figure 2:
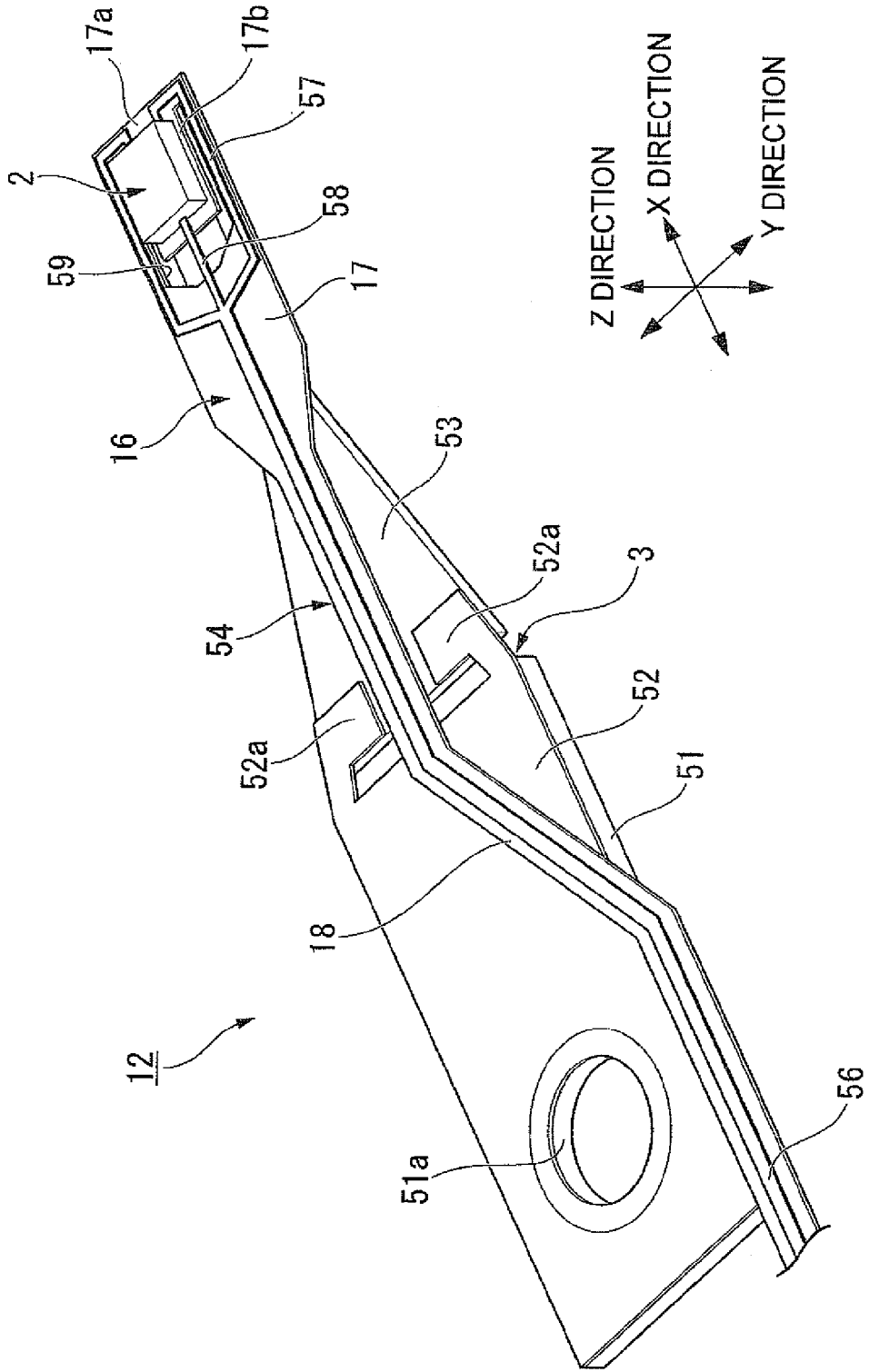
FIG. 2 is a perspective view in which a suspension is viewed from a recording and reproducing head side in a state of causing a recording and reproducing head to face upward.

In addition, an information recording and reproducing device 1 of the present embodiment performs the recording and reproducing on a disk D by a hybrid magnetic recording method in which a near-field light R cooperates with a recording magnetic field, with respect to the disk (a magnetic recording medium) D having a perpendicular recording layer d2 (see FIG. 2).

First Embodiment

Information Recording and Reproducing Device

Figure 1:
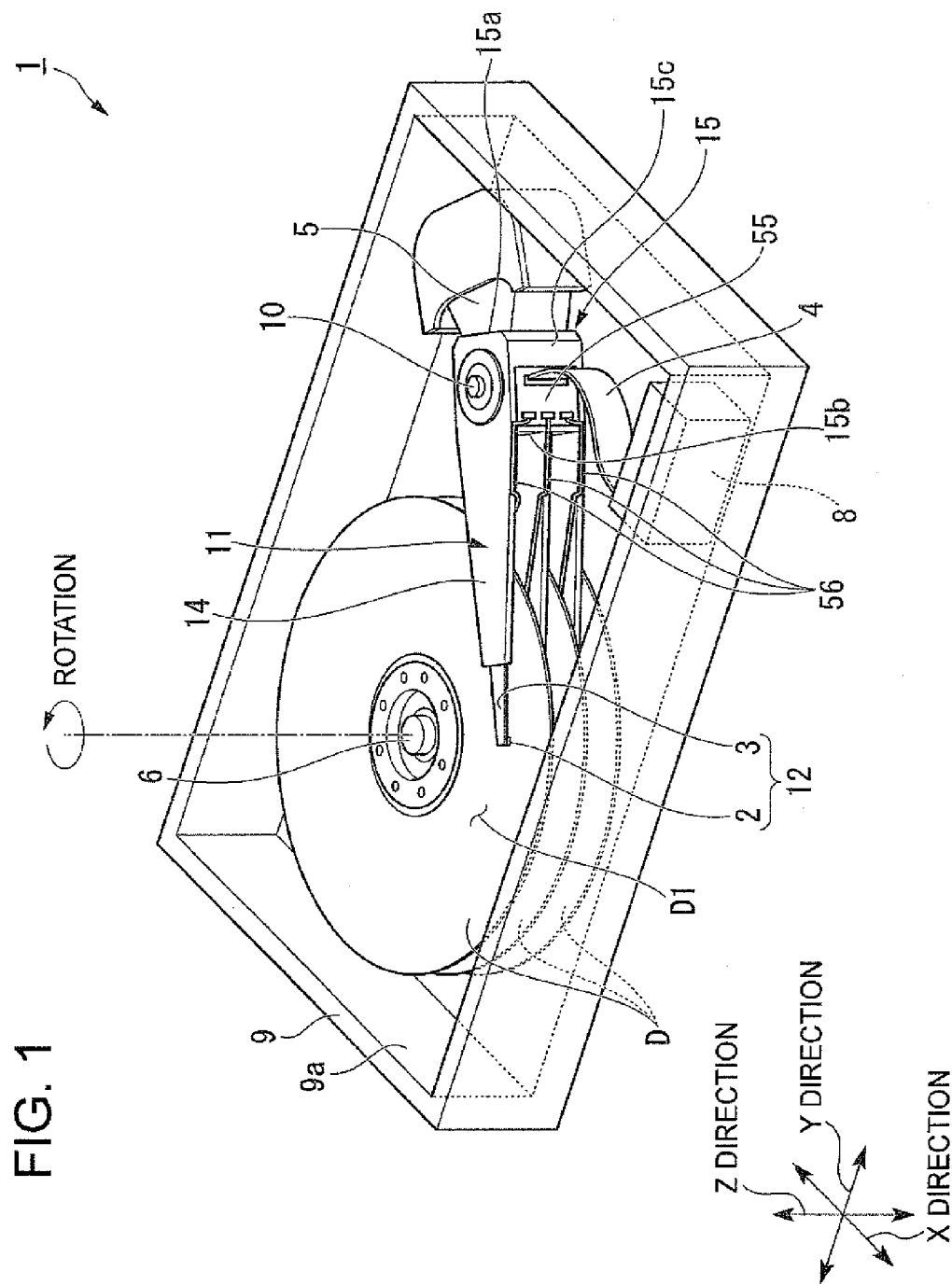
FIG. 1 is a configuration diagram of an information recording and reproducing device in an embodiment of the present invention.

FIG. 1 is a configuration diagram of an information recording and reproducing device.

As shown in FIG. 1, an information recording and reproducing device 1 of the present embodiment includes a carriage 11, a head gimbal assembly (HGA) 12 supported on a tip side of the carriage 11, an actuator 5 which scans and moves the head gimbal assembly 12 toward an XY direction parallel to a disk surface D1 (a surface of the disk D), a spindle motor 6 which rotates the disk D toward a predetermined direction, a control portion 8 which supplies electric current modulated depending in information to a recording and reproducing head (a near-field light head) 2 of the head gimbal assembly 12, and a housing 9 which accommodates the respective components in an inner portion.

The housing 9 is formed in a rectangular shape when viewed from an upper surface by a metallic material such as aluminum and is formed with a concave portion 9a accommodating the respective components at the inner side thereof. Furthermore, a lid (not show) is attachably and detachably fixed to the housing 9 so as to cover an opening of the concave portion 9a. A spindle motor 6 is mounted on an approximately center of the concave portion 9a, and the disk D is fixed in a freely attachable and detachable manner by inserting a center hole into the spindle motor 6. In addition, in the present embodiment, a case is described where three disks D are fixed to the spindle motor 6. However, the number of the disks D is not limited to three.

An actuator 5 is mounted on a corner portion of the concave portion 9a. The carriage 11 is mounted on the actuator 5 via a pivot shaft 10. The carriage 11 is integrally formed by machining of an arm portion 14 extended from the proximal end portion toward the tip portion along the disk surface D1 and a base portion 15 supporting the arm portion 14 in a cantilever shape via the proximal end portion.

The base portion 15 is formed in a rectangular shape and is supported so as to be rotatable around the pivot shaft 10. That is, the base portion 15 is connected to the actuator 5 via the pivot shaft 10, and the pivot shaft 10 is a rotation center of the carriage 11.

The arm portion 14 has a flat plate shape extended parallel to a plane direction (an XY direction) of an upper surface of the base portion 15 in a side surface 15b (a side surface of an opposite side of the corner portion) of an opposite side of the side surface 15a mounted with the actuator 5 in the base portion 15. Three arm portions 14 are extended along a height direction (a Z direction) of the base portion 15. Specifically, the arm portion 14 is formed in a taper shape which is tapered as going from the proximal end portion to the tip portion, and is formed so that the disk D is interposed between the respective arm portions 14. That is, the arm portion 14 and the disk D are placed so as to be staggered, and the arm portion 14 can be moved in the direction (the XY direction) parallel to the surface of the disk D by the driving of the actuator 5. In addition, the carriage 11 and the head gimbal assembly 12 are retreated from the disk D by the driving of the actuator 5 when the rotation of the disk D is stopped.

Head Gimbal Assembly

The head gimbal assembly 12 supports the recording and reproducing head 2 which is a near-field light head having a near-field light generating element (a light flux propagation element) 26 described below.

Figure 3:
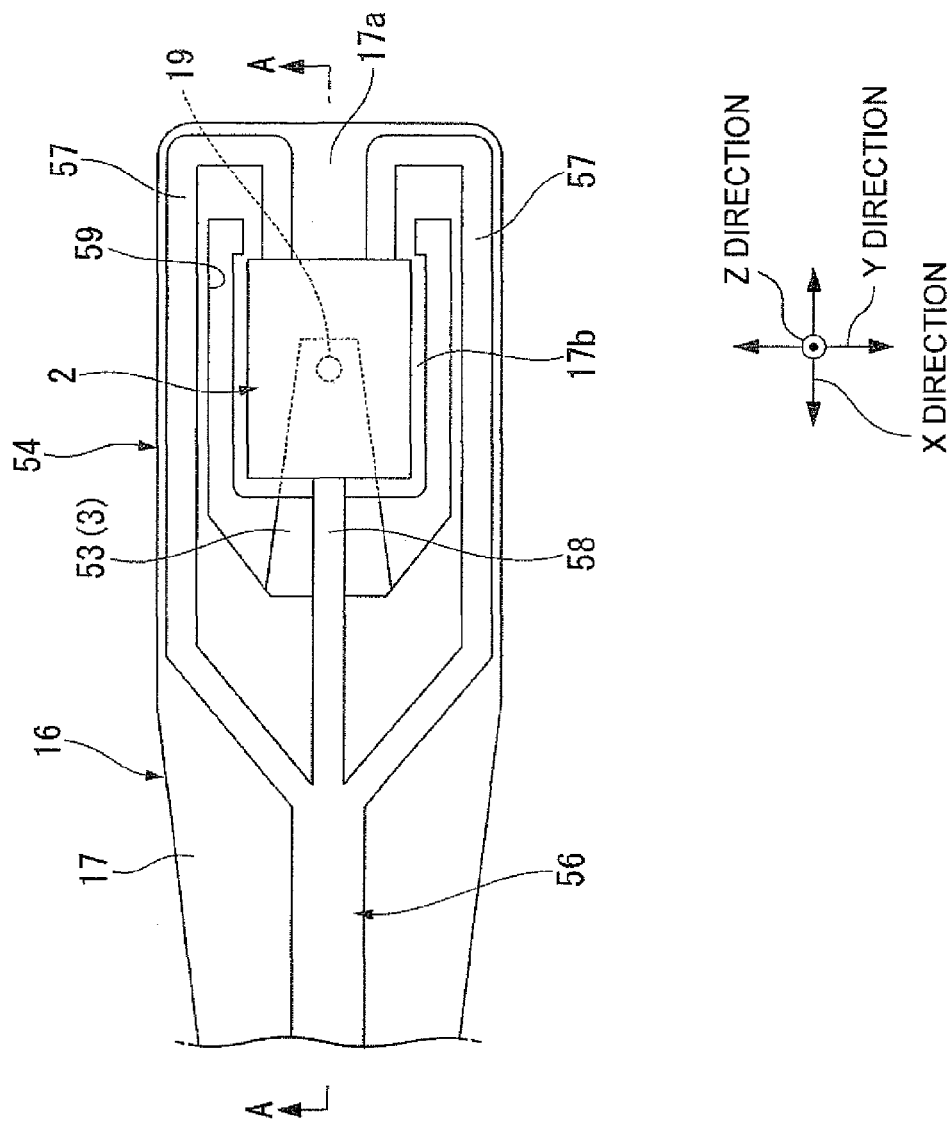
FIG. 3 is a plan view showing a gimbal in a state of causing the recording and reproducing head to face upward.
Figure 4:
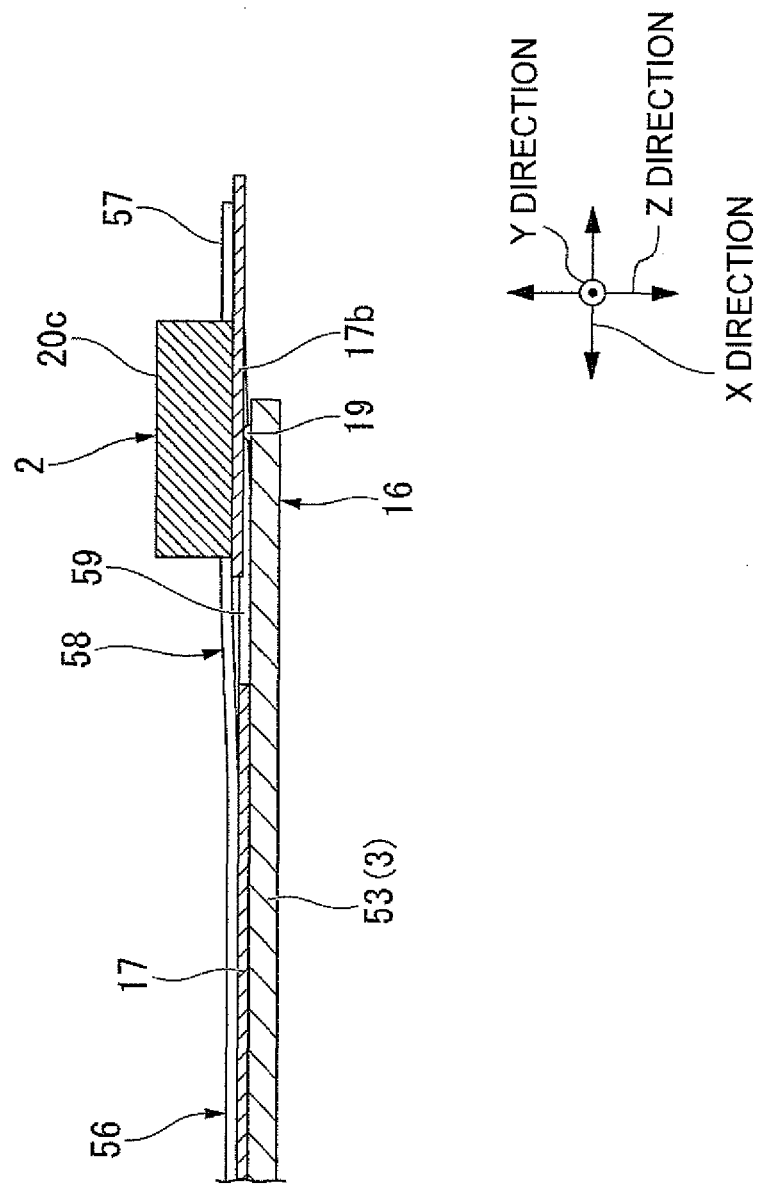
FIG. 4 is a cross-sectional view along a line A-A of FIG. 3.
Figure 5:
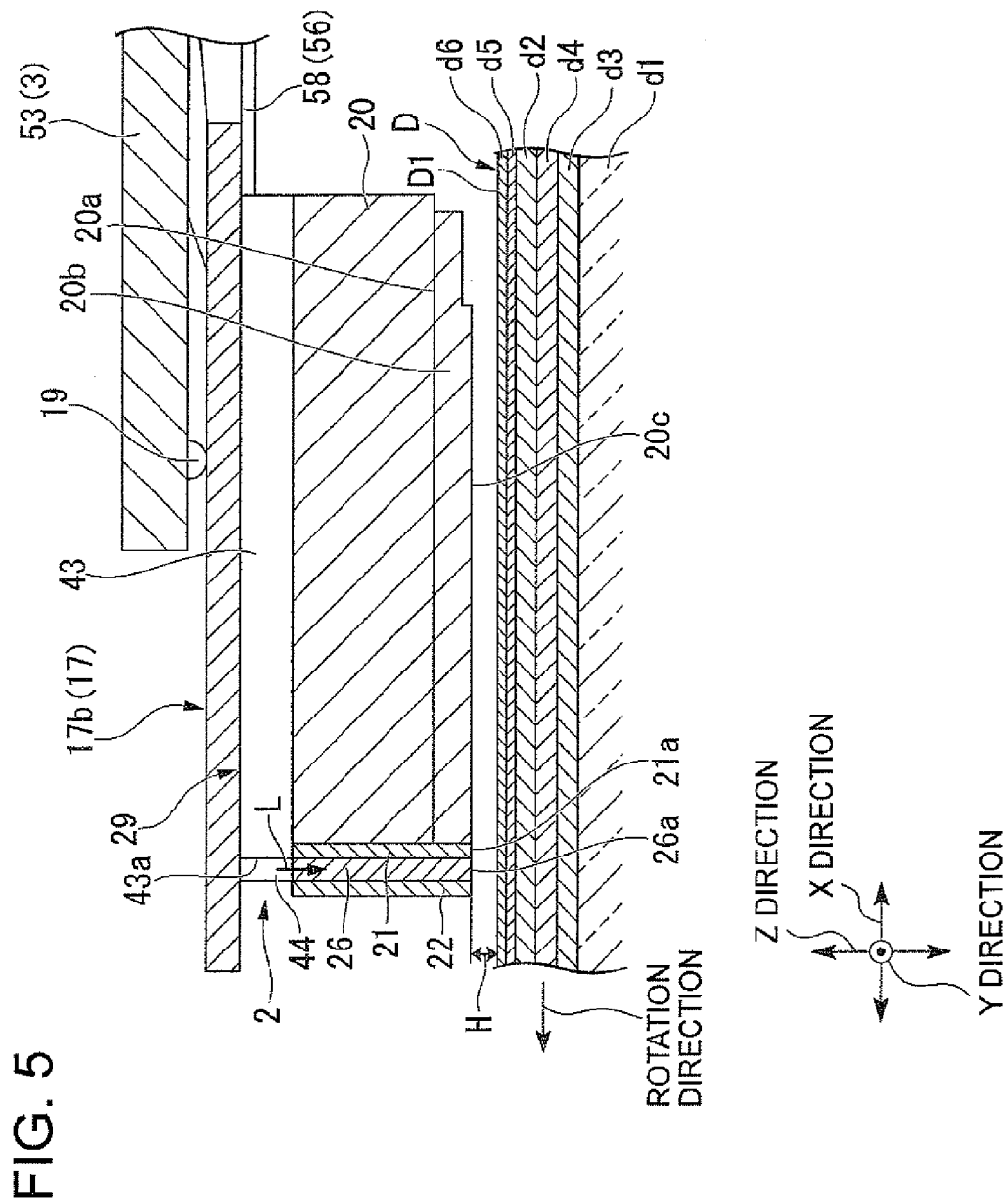
FIG. 5 is an enlarged cross-sectional view of a recording and reproducing head.

FIG. 2 is a perspective view in which a suspension is viewed from the recording and reproducing head side in a state of causing the recording and reproducing head to face upward. FIG. 3 is a plan view showing the gimbal in a state of causing the recording and reproducing head to face upward. FIG. 4 is a cross-sectional view along a line A-A of FIG. 3, and FIG. 5 is an enlarged cross-sectional view of the recording and reproducing head.

As shown in FIGS. 2 to 5, the head gimbal assembly 12 of the present embodiment has a function of causing the recording and reproducing head 2 to float from the disk D, and includes the recording and reproducing head 2, a suspension 3 which is formed of a metallic material in a thin flat shape and can be moved in the XY direction parallel to the disk surface D1, and gimbal means 16 for fixing the recording and reproducing head 2 to a lower surface of the suspension 3 in a state of being rotatable around two axes (an X axis and a Y axis) parallel to the disk surface D1 and perpendicular to each other, that is, so as to be twisted around the two axes.

Suspension

As shown in FIGS. 2 to 4, the suspension 3 mentioned above includes a base plate 51 formed in an approximately rectangular shape when viewed from an upper surface, and a load beam 53 having an approximately triangular shape when viewed from the plan connected to the tip side of the base plate 51 via a hinge plate 52.

The base plate 51 is formed of a thin metallic material such as stainless steel and is formed with an opening 51a penetrating in a thickness direction at the proximal end side thereof. Moreover, the base plate 51 is fixed to the proximal end of the arm portion 14 via the opening 51a.

On a lower surface of the base plate 51, a sheet-like hinge plate 52 formed of a metallic material such as a stainless steel is placed. The hinge plate 52 is a plate material formed over the whole surface of the lower surface of the base surface 51, and the tip portion thereof is formed as an extending portion 52a which is extended from the tip of the base plate 51 along a longitudinal direction (the X direction) of the base plate 51. Two extending portions 52a are extended from both end portions of the hinge plate 52 in a width direction (the Y direction), and the load beam 53 is connected to the tip portions thereof.

The load beam 53 is formed of a thin metallic material such as stainless steel like the base plate 51, and a proximal end thereof is connected to the hinge plate 52 with a gap formed between the proximal end and the tip of the base plate 51.

As a result, the suspension 3 is bent around a portion between the base plate 51 and the load beam 53, and is easily deflected, and thus, the suspension 3 is easily deformed to the Z direction perpendicular to the disk surface D1.

Furthermore, a flexure 54 is provided on the suspension 3.

The flexure 54 is a sheet-like member formed of a metallic material such as stainless steel, and is configured so as to be deflection-deformable in the thickness direction by being formed in the sheet shape. Furthermore, the flexure 54 includes a gimbal 17 which is fixed to the tip side of the load beam 53 and has an external form which is formed in an approximately pentagon shape when viewed from the upper surface, and a supporter 18 which is formed with narrow width by the gimbal 17 and is extended along the suspension 3 from the proximal end portion of the gimbal 17.

The gimbal 17 is formed so as to be slightly warped in the thickness direction from near the middle toward the disk surface D1 over the tip. Moreover, the warped tip side is fixed from the proximal end side to the load beam 53 over the approximately near the middle so as not come into contact with the load beam 53. Furthermore, at the tip side of the floating gimbal 17, a notch portion 59 is formed in which the periphery thereof is hollowed in a U shape, and a portion surrounded by the notch portion 59 is formed with a pad portion 17b supported by the connection portion 17a in a cantilever shape.

That is, the pad portion 17b overhangs and is formed from the tip side to the proximal end side of the gimbal 17 by the connection portion 17a, and includes the notch portion 59 therearound.

As a result, the pad portion 17b is easily deflected in the thickness direction of the gimbal 17, and only an angle of the pad portion 17b is adjusted so as to be parallel to the lower surface of the suspension 3. Moreover, the recording and reproducing head 2 mentioned above is mounted on and fixed to the pad portion 17b. That is, the recording and reproducing head 2 hangs on the load beam 53 via the pad portion 17b.

Furthermore, as shown in FIGS. 3 and 4, the tip of the load beam 53 is formed with a protrusion portion 19 projected toward approximately centers of the pad portion 17b and the recording and reproducing head 2. The tip of the protrusion portion 19 is rounded. Moreover, the protrusion portion 19 comes into point contact with the surface (the supper surface) of the pad portion 17b when the recording and reproducing head 2 floats to the load beam 53 side by wind pressure received from the disk D.

That is, the protrusion portion 19 supports the recording and reproducing head 2 via the pad portion 17b of the gimbal 17, and applies load to the recording and reproducing head 2 toward the disk surface D1 (toward the Z direction).

In addition, the gimbal 17 having the protrusion portion 19 and the pad portion 17 constitutes the gimbal means 16.

Recording and Reproducing Head

Figure 6:
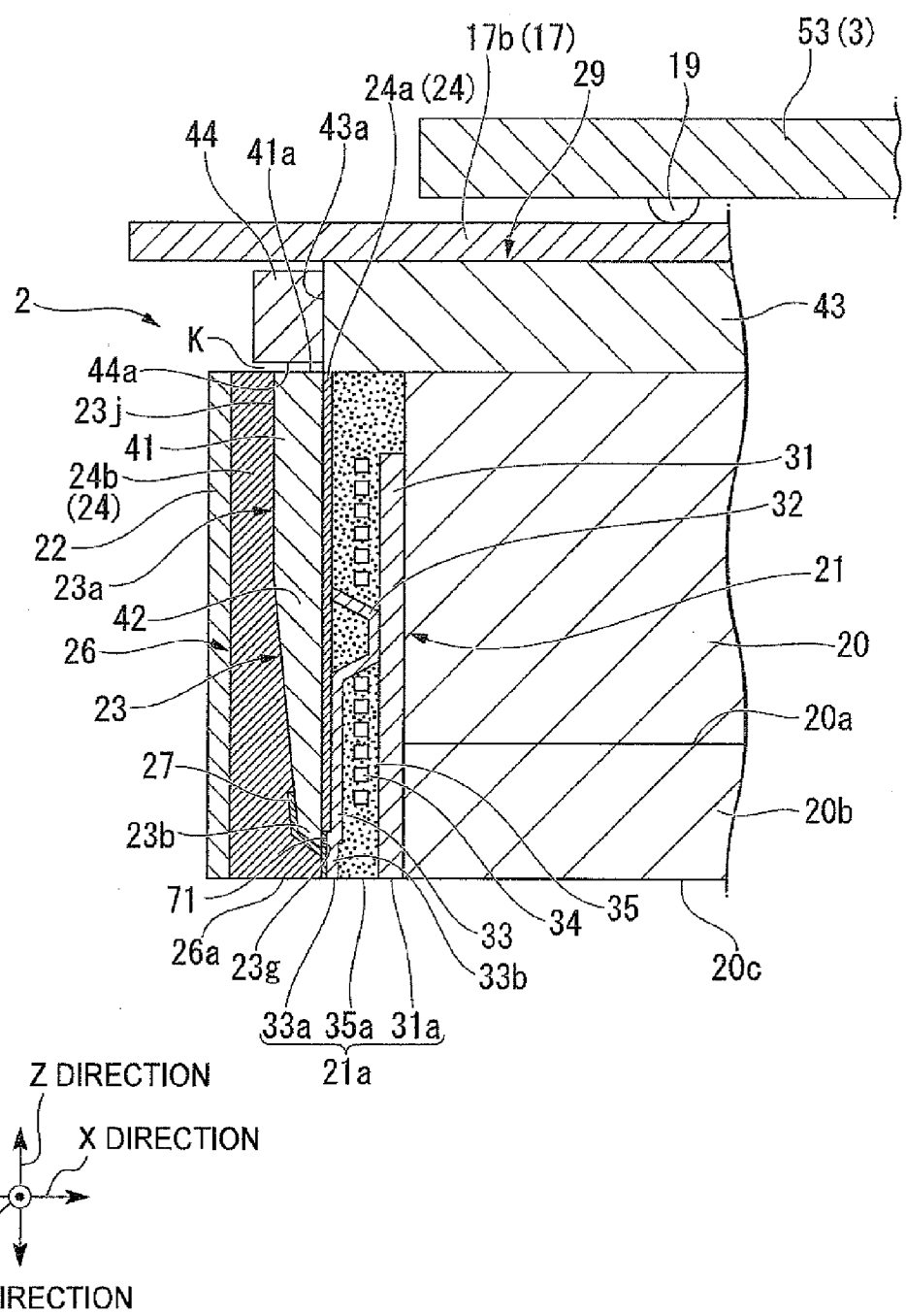
FIG. 6 is an enlarged cross-sectional view of a side surface of an outflow end side of the recording and reproducing head.

FIG. 6 is an enlarged cross-sectional view of an outflow end side of the recording and reproducing head.

The recording and reproducing head 2 is supported on the lower surface of the suspension 3 with the gimbal 17 interposed therebetween in the state of being placed between the disk D and the suspension 3.

Specifically, as shown in FIGS. 5 and 6, the recording and reproducing head 2 records and reproduces a variety of information on the rotating disk D by the use of the near-field light R generated from the laser beam L. The recording and reproducing head 2 includes a slider 20 which is placed opposite to the disk D in the state of floating from the disk surface D1 by a predetermined distance H, a recording element 21 which records information on the disk D, a reproducing element 22 which reproduces information recorded on the disk D, a near-field light generating element 26 which propagates the laser beam L while focusing the same and emits the laser beam L to the outside after being generated in the near-field light R (see FIG. 12), and a laser beam source 29 which emits the laser beam L toward the near-field light generating element 26.

The slider 20 is formed in a rectangular shape by a light transmissive material such as quartz glass, ceramic such as AlTiC (altic) or the like. The slider 20 has a facing surface 20a facing the disk D, and is supported on the pad portion 17b mentioned above via a laser mount 43 described below.

Furthermore, the facing surface 20a is formed with a convex portion 20b which generates pressure for floating from viscosity of an air flow generated by the rotating disk D. The convex portion 20b is formed so as to be extended in the longitudinal direction (the X direction). Two convex portions 20b are formed left and right (the Y direction) spaced so as to be aligned in a rail shape. However, the convex portion 20b is not limited to this case, but if the convex portion 20b is designed so as to adjust a positive pressure trying to separate the slider 20 from the disk surface D1 and a negative pressure trying to attracting the slider 20 to the disk surface D1 and cause the slider 20 to float in an optimal state, any convex and concave shape may be adopted. In addition, the surface of the convex portion 20b is called an ABS (AIR BEARING SURFACE) 20c.

Moreover, the slider 20 receives force floating from the disk surface D1 by the two convex portions 20b. Meanwhile, the suspension 3 is deflected in a Z direction perpendicular to the disk surface D1 and absorbs the floating force of the slider 20. That is, the slider 20 receives force pressed to the disk surface D1 side by the suspension 3 when floating. Thus, the slider 20 is adapted to float in the state of being separated from the disk surface D1 by a predetermined distance H as mentioned above by a balance of both forces. In addition, since the slider 20 is adapted to be rotated around the X axis and the Y axis by the gimbal means 16, the slider 20 always floats in the state of the stable posture.

In addition, the air flow generated along with the rotation of the disk D flows in from an inflow end side (a proximal end side of the suspension 3 in the X direction) of the slider 20, then flows along the ABS 20c, and is discharged from an outflow end side (a tip side of the suspension 3 in the X direction) of the slider 20.

Hereinafter, the inflow end side (a leading edge side) of the slider 20, that is, a right side of the X direction in FIG. 5 is called "backward", and the outflow end side (a trailing edge side) of the slider 20, that is, a left side of the X direction in FIG. 5 is called "forward". Furthermore, the disk surface D1 side in the recording and reproducing head 2, that is, a lower side of the Z direction in FIG. 5 is called "downward", and the opposite side thereof, that is, an upper side of the Z direction in FIG. 5 is called "upward".

The recording element 21 generates a recording magnetic field from a facing surface 21a facing the disk surface D1 shown in FIG. 5, and causes the recording magnetic field to act on the disk D to record information. As shown in FIG. 6, the recording element 21 is held in the end portion in front of the slider 20. The recording element 21 is equipped with an return pole 31 which is fixed to the end surface (a front end surface) in front of the slider 20, a main magnetic pole 33 which is disposed in front of the return pole 31 and is connected to the return pole 31 via a magnetic circuit 32, and a coil 34 which is wound around the magnetic field 32 centered on the magnetic field 32 in a spiral shape. That is, the return pole 31, the magnetic circuit 32, the coil 34, and the main magnetic pole 33 are sequentially placed side by side forward from the front end surface of the slider 20.

Both magnetic poles 31 and 33 and the magnetic circuit 32 are formed of high saturation flux density (Bs) material (for example, ConiFe alloy, CoFe alloy or the like) having high flux density. Furthermore, the coil 34 is placed so as to form a gap between the adjacent coil lines, between the coil 34 and the magnetic circuit 32, and between the coil 34 and both magnetic poles 31 and 33, and is molded by the insulator 35 in this state. Moreover, the coil 34 is adapted such that current modulated depending on information is supplied from the control portion 8 (see FIG. 1). That is, the magnetic circuit 32 and the coil 34 constitute an electromagnet as a whole. Furthermore, the respective facing surfaces 33a, 31a, and 35a (the Z direction end surface) of the main magnetic pole 33, the return pole 31, and the insulator 35 mentioned above facing the disk surface D1 are formed on the same plane as that of the ABS 20c of the slider 20. In the recording element 21 of the configuration mentioned above, the coil 34 is supplied with an electric current, whereby a recording magnetic field is generated in which a line of magnetic force exits from the facing surface 33a of the main magnetic pole 33 and enters the facing surface 31a of the return pole 31.

As shown in FIG. 6, the near-field light generating element 26 generates the near-field light R from the facing surface 26a facing the disk surface D1, and is disposed in front of (the opposite side of the return pole 31 relative to the main magnetic pole 33 shown in FIG. 6) of the recording element 21. The near-field generating element 26 includes a core (a first core) 23 provided so as to be extended vertically with a tip thereof facing the disk surface D1, a metal film (the near-field light generating portion) 71 placed in close contact with the side surface (the side surface 23g) of the main magnetic pole 33 side in the lower end portion of the core 23, a light shielding film 27 covering the lower end portion of the core 23, and a cladding 24 sealing the core 23 in close contact with the side surface of the core 23.

Figure 7:
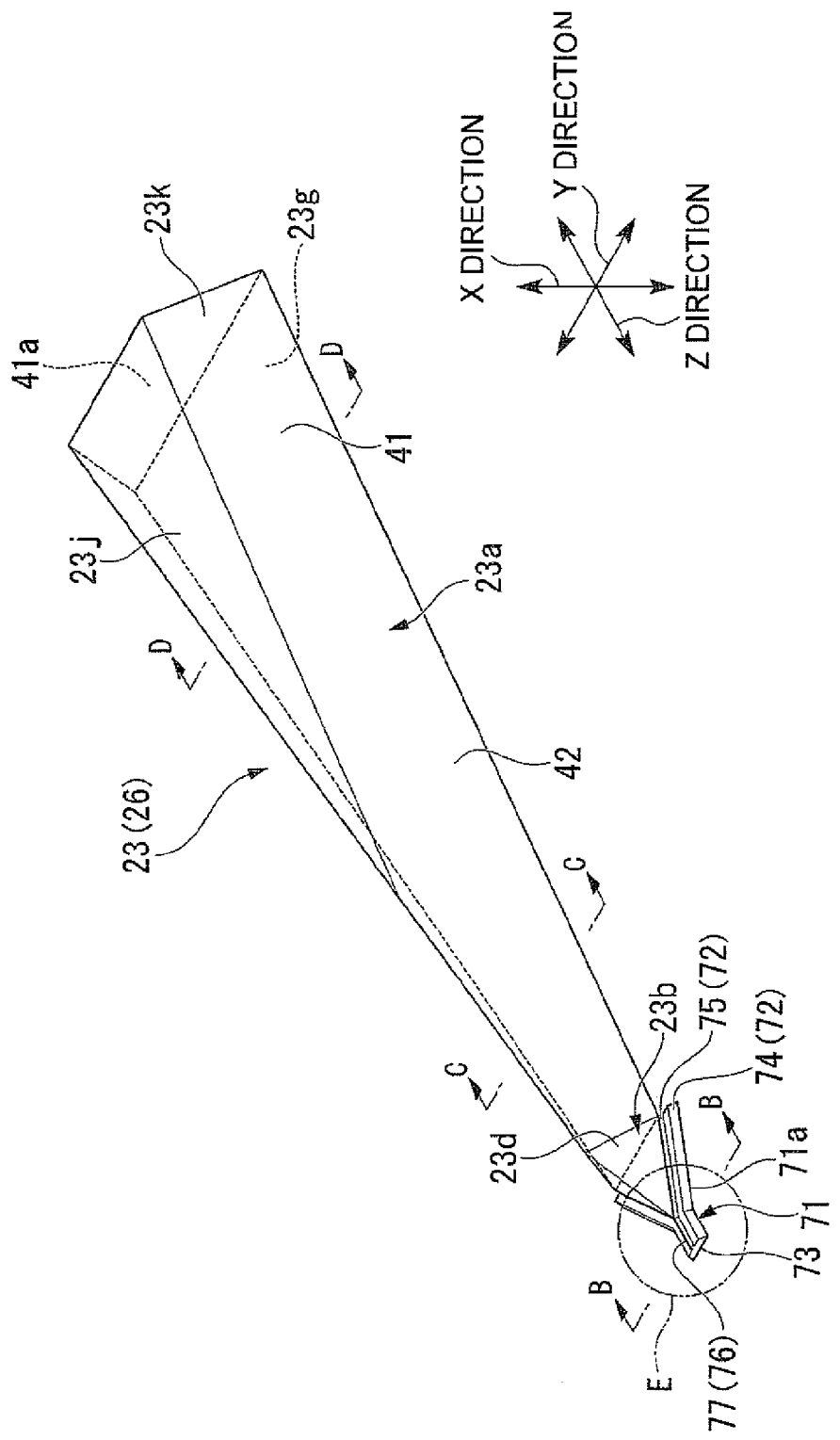
FIG. 7 is a perspective view of a core and a metal film.
Figure 8A:
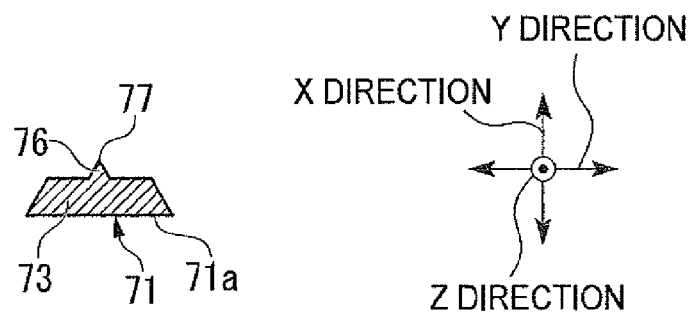
FIGS. 8A to 8C are cross-sectional views of the core and the metal film.
Figure 8B:
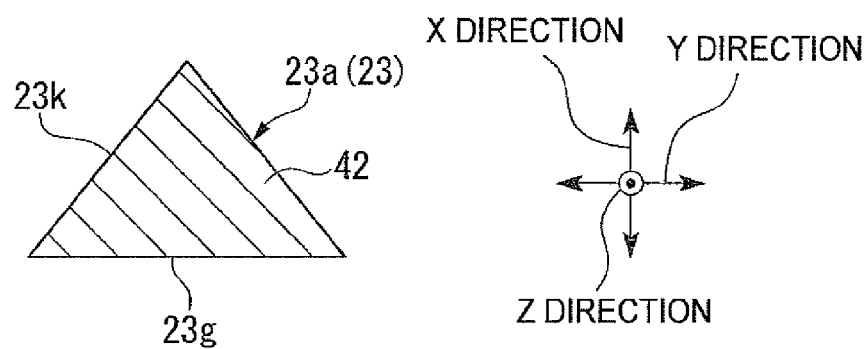
Figure 8C:
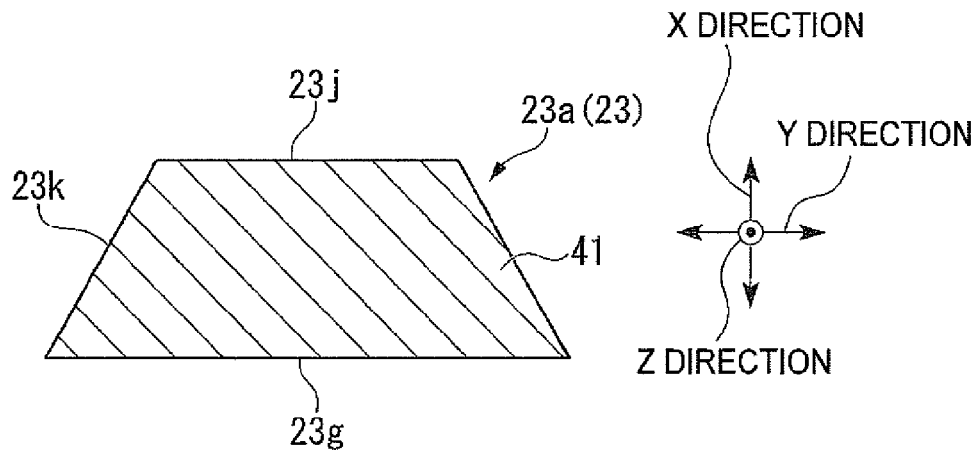

FIG. 7 is a perspective view of the core and the metal film. FIGS. 8A to 8C are cross-sectional view of the core and the metal film, FIG. 8A is a cross-sectional view along a line B-B of FIG. 7, FIG. 8B is a cross-sectional view along a line C-C of FIG. 7, and FIG. 8C is a cross-sectional view along a line D-D of FIG. 6.

As shown in FIGS. 7 and 8A to 8C, the core 23 is a light flux propagation member which propagates the laser beam L incident from the upper end side (the one end side) while focusing the laser light L toward the lower end side (the other end side). The core 23 is gradually drawn from the upper end side to the lower end side and can propagate the laser beam L while gradually focusing the laser beam L in the inner portion. Described specifically, the core 23 has a light flux focusing portion 23a and a near-field light generating portion 23b from the upper side.

The light flux focusing portion 23a is a portion which is drawn such that a cross sectional area (a cross sectional area in the XY direction) perpendicular to the Z direction facing from the upper end side to the lower end side is gradually reduced. The light flux focusing portion 23a propagates the introduced laser beam L downward while focusing the same. That is, it is possible to gradually narrow the spot size of the laser beam L introduced to the light flux focusing portion 23a to the small size. Specifically, the light flux focusing portion 23a includes a trapezoidal portion 41 (see FIG. 8C) in which cross sectional shape (an incident side end surface) when viewed from the Z direction at the upper end side is formed in a trapezoidal shape, and a triangular portion 42 (see FIG. 8B) which is integrally connected to the lower end portion of the trapezoidal portion 41 and in which a cross sectional shape when viewed from the Z direction is formed in a triangular shape.

As shown in FIGS. 7 and 8C, the trapezoidal portion 41 is formed in a flat shape in which a left and right direction is a longitudinal direction (the Y direction), and a front and rear direction (the X direction) is a transverse direction. Specifically, the trapezoidal portion 41 includes a rear side surface 23g, a pair of side surfaces 23k which is extended so as to be tapered from left and right either end edges (both ends in the Y direction) of the side surface 23g toward the reproducing element 22, and a side surface 23j which is extended parallel to the side surface 23g and spans between the pair of side surfaces 23k. The trapezoidal portion 41 is formed such that lengths (widths in the Y direction) of both bottom surfaces (the rear side surface 23g and the front side surface 23j) are gradually reduced as facing toward the lower end side. Furthermore, the upper end surface 41a (the upper end surface of the core 23) of the trapezoidal portion 41 is formed on the same plane as the upper surface of the slider 20 and is exposed toward the outside.

As shown in FIGS. 7 and 8B, in the triangular portion 42, the bottom surface and a pair of slope surfaces are constituted by the side surface 23g and the side surface 23k mentioned above. The triangular portion 42 is formed such that the length of the bottom surface (the side surface 23g) and the length of the slope surface (the side surface 23k) are gradually reduced toward the lower end side.

Figure 9:
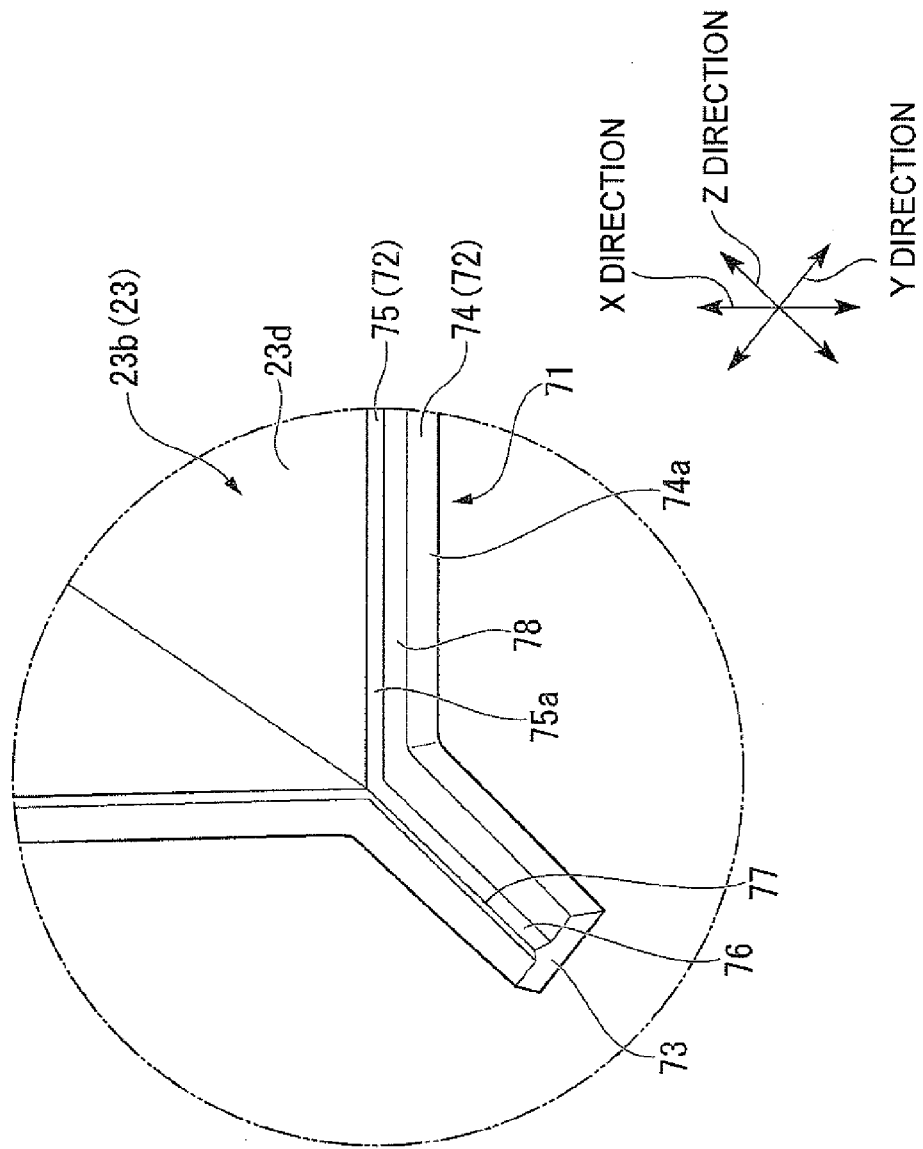
FIG. 9 is an enlarged view of an E portion of FIG. 7.
Figure 10:
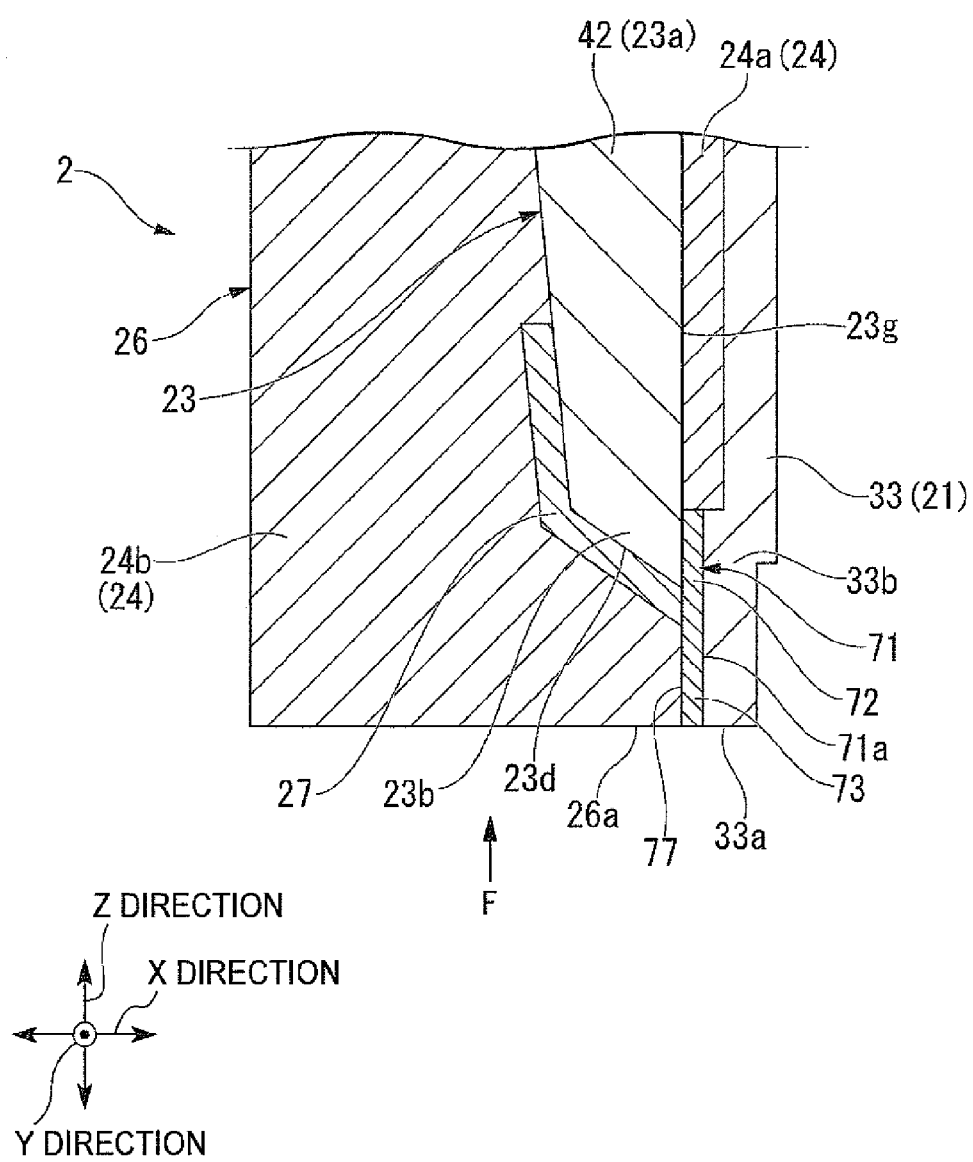
FIG. 10 is an enlarged view of a main portion of FIG. 6.
Figure 11:
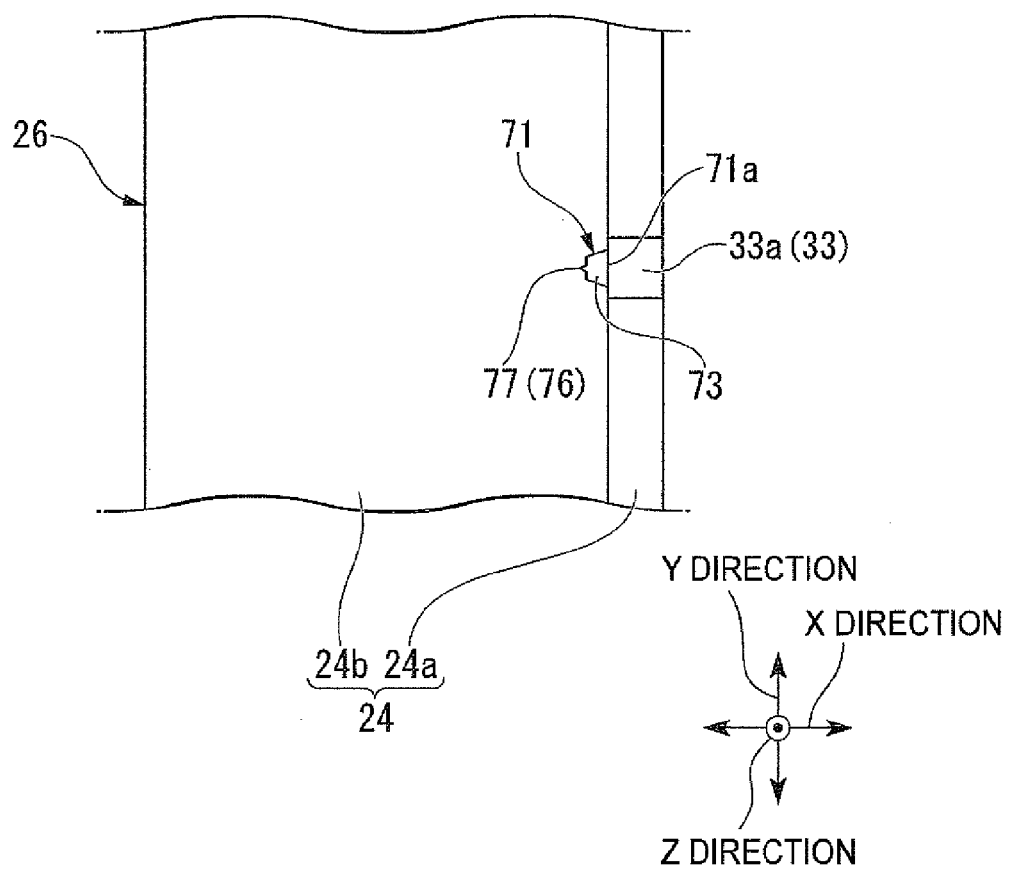
FIG. 11 is a diagram taken from a direction of an arrow F of FIG. 10.

FIG. 9 is an enlarged view of a portion E of FIG. 7. Furthermore, FIG. 10 is an enlarged view of a major portion of FIG. 6. FIG. 11 is a diagram in a direction taken from an arrow F of FIG. 10.

As shown in FIGS. 7 to 11, the near-field light generating portion 23b is a portion which is further drawn downward from the lower end portion in the triangular portion 42 in the light flux focusing portion 23a. The near-field light generating portion 23b has a cross sectional shape formed in a triangular shape when viewed from the Z direction, and the bottom surface thereof is constituted by the side surface 23g mentioned above, and the pair of slope surface is constituted by the side surface 23d. Specifically, the side surface 23g is formed in a triangular shape tapered downward and comes into close contact with the tip portion 33b of the main magnetic pole 33.

The side surface 23d is a portion becoming the lower end surface of the core 23, and is extended in the state of sloping to an optical axis (the Z direction) of the laser beam L. Specifically, each side surface 23d is extended from the entire end edges (the lower end edge) situated in both ends of the side surface 23g in the Y direction toward the reproducing element 22 (forward). Furthermore, each side surface 23d slopes such that an angle formed between side surface 23d and the side surface 23g becomes an acute angle, respectively, and the laser beam L incident to the side surface 23*d* is reflected such that the introduction direction of the laser beam L faces the metal film 71. Thus, the near-field light generating portion 23*b* is in a state of being pointed downward and forward. Moreover, the lower end of the near-field light generating portion 23*b* is situated above the ABS 20*c* of the slider 20, is covered by the cladding 24, and is not exposed to the outside. In this manner, in the core 23, the upper end surface 41*a* of the trapezoidal portion 41 constitutes an incident end of the laser beam L emitted from the laser beam source 29, and the lower end portion of the near-field light generating portion 23*b* constitutes an exit end of the laser beam L.

As shown in FIGS. 6 and 7, the cladding 24 is a mold member which is formed of a material having a refractive index lower than that of the core 23, and comes into close contact with the side surfaces 23*d*, 23*g*, 23*j*, and 23*k* to seal the core 23. Furthermore, the cladding 24 exposes the upper end surface 41*a* of the core 23 to the outside, and seals the lower end of the core 23 in the inner portion. Specifically, the cladding 24 includes a first cladding 24*a* which is formed so as to cover the core 23 from the rear side between the core 23 and the recording element 21 (the main magnetic pole 33), and a second cladding 24*b* which is formed so as to cover the core 23 from the front side between the core 23 and the reproducing element 22. In this manner, since the first cladding 24*a* and the second cladding 24*b* come into close contact with the side surfaces 23*d*, 23*g*, 23*j*, and 23*k* of the core 23, a gap is not generated between the core 23 and the cladding 24.

In addition, upon describing an example of a combination of the materials used as the cladding 24 and the core 23, for example, a combination is considered in which the core 23 is formed of quartz ($SiO_2$), the cladding 24 is formed of quartz doped with fluorine. In this case, when the wavelength of the laser beam L is 400 nm, the refractive index of the core 23 is 1.47, the refractive index of the cladding 24 is less than 1.47, and thus this is a desirable combination.

Furthermore, a combination is also considered in which the core 23 is formed by quartz doped with germanium, and the cladding 24 is formed by quartz ($SiO_2$). In this case, when the wavelength of the laser beam L is 400 nm, the refractive index of the core 23 becomes greater than 1.47, the refractive index of the cladding 24 is 1.47, and thus, this is also a desirable combination.

Particularly, the greater the refractive index difference between the core 23 and the cladding 24 is, the greater force confining the laser beam L in the core 23 is. Thus, it is more preferable to increase the refractive difference between them by using tantalum oxide ($Ta_2O_5$: when the wavelength is 550 nm, the refractive index is 2.16) in the core 23 and using quartz, alumina ($Al_2O_3$) or the like in the cladding 24. Furthermore, in the case of using the laser beam L of an infrared region, it is also effective to form the core 23 by silicon (Si: the refractive index is about 4) which is a material transparent to infrared light.

As shown in FIGS. 7 to 11, a metal film 71 is formed between the core 23 and the first cladding 24*a*. The metal film 71 generates the near-field light R from the laser beam R propagated in the core 23 and localizes the near-field light R between the lower end side of the near-field light generating element 26 and the disk D. The metal film 71 is formed of, for example, gold (Au) platinum (Pt) or the like. Furthermore, a rear side surface 71*a* (see FIG. 10) in the metal film 71 is in contact with the tip portion 33*b* of the main magnetic pole 33 exposed from the first cladding 24*a*.

Herein, the metal film 71 has a base portion 72 placed on the side surface 23*b* of the near-field light generating portion 23*b* in the cores 23, and an extending portion 73 extended downward from the base portion 72.

The base portion 72 has a triangular shape when viewed from the X direction, and is provided with a first base portion 74 with a width in the Y direction formed to be wider than that of the core 23, and a second base portion 75 erected forward (to the core 23 side) from the center portion of the first base portion 74 via a step portion 78.

As shown in FIGS. 7 and 9, the first base portion 74 is configured so that the upper end side thereof is situated in a boundary portion between the near-field light generating portion 23*b* and the light flux focusing portion 23*a*, and the lower end side thereof is situated in the same position as that of the lower end of the core 23. Furthermore, the first base portion 74 is formed so that the width in the Y direction is gradually reduced as facing forward. Specifically, side surfaces 74*a* (see FIG. 9) of both sides in the first base portion 74 in the Y direction are formed on a slope surface parallel to the side surface 23*d* of the core 23. That is, an angle (formed between the side surface 71*a* and the side surface 74*a*) of both end portions of the Y direction in the first base portion 74 is formed so as to be equal to an angle (an angle formed between the side surface 23*g* and the side surface 23*d*) of both end portions of the Y direction in the near-field light generating portion 23*b*.

The step portion 78 is a flat surface along the XY direction, and a second base portion 75 is formed at the inner side of the Y direction.

The second base portion 75 is configured so that the length in the Z direction is formed to be equal to that of the first base portion 74, the width thereof in the Y direction is formed to be smaller than that of the first base portion 74, and the external form thereof in the XY direction is formed to be equal to that of the side surface 23*g* of the near-field light generating portion 23*b*. Furthermore, the second base portion 75 is formed so that the width thereof in the Y direction is gradually reduced as facing forward. Specifically, the side surfaces 75*a* (see FIG. 9) of both sides of the Y direction in the second base portion 75 are formed in the slope surface placed on the same plane as the side surface 23*d* of the core 23. That is, the angle (the angle formed between the side surface 71*a* and the side surface 75*a*) of both end portions of the Y direction in the second base portion 75 is formed to be equal to the angle (the angle formed between the side surface 23*g* and the side surface 23*d*) of both end portions of the Y direction in the near-field light generating portion 23*b*.

As shown in FIGS. 7 to 11, the extending portion 73 is configured so that the thickness in the X direction is formed to be equal to that of the first base portion 74, and has a rectangular shape when viewed from the X direction extended downward from the lower end portion (the top portion of the first base portion 74) of the first base portion 74. A lower end portion of the extending portion 73 is exposed to the outside to the facing surface 26*a* of the near-field light generating element 26. That is, the extending portion 73 is configured so that the upper end portion is placed in the same position as the lower end of the near-field light generating portion 23*b* and the lower end portion is placed on the same plane as the ABS 20*c* of the slider 20, in the Z direction. Furthermore, the extending portion 73 is configured so that the width in the Y direction is formed to be narrower than that of the tip portion 33*b* of the main magnetic pole 33.

In the center portion of the Y direction in the extending portion 73, a protrusion portion 76 is erected forwards (to the cores 23 side). The protrusion portion 76 is formed in a triangular shape which is tapered as facing forward when viewed from the Z direction, and the position of the top portion 77 is placed in the same position as the rear side surface 23g of the core 23 mentioned above in the X direction.

Furthermore, the protrusion portion 76 is formed over the entire region of the extending portion 73. Specifically, the protrusion portion 76 is configured so that the upper end portion is connected to the lower end portion of the second base portion 75, and the lower end portion is formed on the same plane as the ABS 20c of the slider 20 and is exposed to the outside. Thus, the top portion 77 is extended from the lower end portion of the second base portion 75 along the Z direction in a ridge shape. Furthermore, the ridge of the top portion 77 is placed on the same straight line as that of the ridge (a ridge formed between each side surface 23d) of the near-field light generating portion 23b when viewed from the X direction.

The light shielding film 27 is to block light incident from the outside to the near-field light generating portion 23b and prevent the laser beam L propagated in the core 23 from leaking from the core 23, and is formed of a material of a high reflectance such as aluminum (Al). The light shielding film 27 is formed so as to cover the side surface 23d of the near-field light generating portion 23b. That is, the near-field light generating portion 23b is configured so that the side surface 23g is covered by the metal film 71 mentioned above and the side surface 23d is covered by the light shielding film 27. That is, the metal film 71 mentioned above is configured so that the base portion 72 is covered by the light shielding film 27 when viewed from the X direction and the extending portion 73 is extended downward rather than the lower end portion of the light shielding film 27. In addition, the light shielding film 27 may be formed so as to cover the whole region of the metal film 71 when viewed from the X direction.

As shown in FIGS. 5 and 6, the reproducing element 22 is a magneto-resistance effect film in which the electric resistance is converted depending on the magnitude of the electric field leaking from the perpendicular recording layer d2 (see FIG. 5) of the disk D, and is formed on the front end surface of the cladding 24 (the second cladding 24b) of the opposite side of the recording element 21 with the near-field light generating element 26 interposed therebetween. The reproducing element 22 is supplied with a bias electric current from the control portion 8 via an electric wiring 56 described below. As a result, the control portion 8 is able to detect a change in electric field leaking from the disk D as a change in voltage and is able to perform the reproduction of the signal from the change of voltage.

As shown in FIGS. 5 and 6, a laser beam source 29 is mounted on the slider 20 of the recording and reproducing head 2. The laser beam source 29 has a laser mount 43 fixed to the upper surface of the slider 20, and a semiconductor laser chip 44 fixed to the front end surface 43a of the laser mount 43.

The laser mount 43 is a plate-like member which formed of, for example, the same material as that of the slider 20 and has an external form in the XY direction formed to be equal to that of the slider 20, and an upper surface side thereof is fixed to a pad portion 17b described later of the gimbal 17. That is, the slider 20 is fixed to the pad portion 17b in the state of interposing the laser mount 43 between the slider 20 and the pad portion 17b. In addition, although it is not shown, an electric wiring 56 (see FIG. 5) described below is fixed to the laser mount 43, and is electrically connected to an electrode pad (not shown) formed on the front end surface 43a of the laser mount 43.

The semiconductor laser chip 44 is implemented on an electrode pad (not shown) formed on the front end surface 43a of the laser mount 43. In this case, the semiconductor laser chip 44 is placed so as to face the upper end surface 41a of the trapezoidal portion 41 of the core 23 in the state causing the exit side end surface 44a of the laser beam L to face downward. In addition, the semiconductor laser chip 44 of the present embodiment emits the elliptical-shaped laser beam L having a spot shape in which the X direction is a short axis direction and the Y direction is a long axis direction. Furthermore, a gap K is formed between the exit side end surface 44a of the semiconductor laser chip 44 and the upper end surface 41a of the trapezoidal portion 41, but oil and the like having the same refractive index as that of the core 23 may be interposed in the gap K. In addition, the shape of the upper end surface 41a of the trapezoidal portion 41 mentioned above is formed to meet the spot shape of the laser beam L at the time point when being emitted from the semiconductor laser chip 44 and incident to the upper end surface 41a.

In addition, as shown in FIG. 5, the disk D of the present embodiment uses' a perpendicular two-layer film disk D including at least two layers of a perpendicular recording layer d2 having an axis of easy magnetization in a direction perpendicular to the disk surface D1 and a soft magnetic layer d3 formed of a high permeability material. As such a disk D, for example, a disk is used in which the soft magnetic layer d3, the intermediate layer d4, the perpendicular recording layer d2, a protective layer d5, and a lubricating layer d6 are sequentially formed on the substrate d1.

For example, as the substrate d1, aluminum substrate, a glass substrate or the like are used. The soft magnetic layer d3 is a high permeability layer. The intermediate layer d4 is a crystal control layer of the perpendicular recording layer d2. The perpendicular recording layer d2 is a perpendicular anisotropic magnetic layer, and, for example, CoCrPt-based alloy is used. The protective layer d5 is to protect the perpendicular recording layer d2, and, for example, a DLC (diamond-like carbon) film is used. As the lubricating layer d6, for example, a fluorine-based liquid lubricant is used.

However, as shown in FIG. 1, a terminal substrate 55 is placed on the side surface 15c in the base portion 15 of the carriage 11. The terminal substrate 55 becomes a relay point when electrically connecting the control portion 8 provided in the housing 9 with the recording and reproducing circuit 2, and various control circuits (not shown) are formed on the surface thereof.

The control portion 8 and the terminal substrate 55 are electrically connected to each other by a flat cable 4 having flexibility, and the terminal substrate 55 and the recording and reproducing head 2 are connected to each other by the electric wiring 56. Three sets of electric wirings 56 are provided corresponding to the recording and reproducing head 2 provided for each carriage 11, and the electric current modulated to the signal output from the control portion 8 via the flat cable 4 depending on information is supplied to the recording and reproducing head 2 via the electric wiring 56.

The electric wiring 56 is routed from the surface of the terminal substrate 55 through the side surface of the arm portion 14 onto the arm portion 14. Specifically, as shown in FIGS. 2 to 4, the electric wiring 56 is placed on the supporter 18 of the flexure 54 on the arm portion 14 and the suspension 3, and is routed up to the tip of the suspension 3 in the state of interposing the supporter 18 therebetween.

Moreover, the electric wiring 56 is branched into a first electric wiring 57 for supplying the reproducing element 22 and the recording element 21 with the electric current in the tip (the intermediate position of the gimbal 17) of the suspension 3, and a second electric wiring 58 for supplying the laser beam source 29 with the electric current.

Specifically, the first electric wiring 57 is bent toward an outer peripheral portion of the gimbal 17 in the branch point in the tip side of the electric wiring 56, and is routed from the outer peripheral portion (the outer side of the notch portion 59) of the gimbal 17. Moreover, the first electric wiring 57 routed from the outer side of the notch portion 59 is connected to the front end surface side of the recording and reproducing head 2 through the connection portion 17a. That is, the first electric wiring 57 is directly connected from the outside of the recording and reproducing head 2 to each of the reproducing element 22 and the recording element 21 provided at the front end surface side of the slider 20.

Meanwhile, the second electric wiring 58 is extended along the longitudinal direction (the X direction) of the gimbal 17 from the branch point mentioned above, and is directly connected laser mount 43 from the rear end surface side of the recording and reproducing head 2 across the notch portion 59 of the gimbal 17. Moreover, the second electric wiring 58 is connected to the electrode pad formed on the front end surface 43a of the laser mount 43 and supplies the semiconductor laser chip 44 with the electric current via the electrode pad. Furthermore, the second electric wiring 58 is separated from the lower surface of the gimbal 17, and is extended in the state of slight floating so as to bridge between the pad portion 17b and the gimbal 17 as facing from the branch point to the front end surface side of the recording and reproducing head 2. That is, on the lower surface of the gimbal 17, the second electric wiring 58 is routed from the center portion of the recording and reproducing head 2 in the width direction (the Y direction) to the back side of the recording and reproducing head 2 in the state of being approximately linearly (a radius of curvature is almost infinite) extended.

Information Recording and Reproducing Method

Next, a case of recording and reproducing variety of information on the disk D by the information recording and reproducing device 1 configured as above will be described as below.

Firstly, as shown in FIG. 1, the spindle motor 6 is driven to rotate the disk D in a certain direction. Next, the actuator 5 is operated to scan the suspension 3 in the XY direction via the carriage 11. As a result, it is possible to situate the recording and reproducing head 2 in a desired position on the disk D. At this time, the recording and reproducing head 2 receives force floating by two convex portions 20b formed on the facing surface 20a of the slider 20, and is pressed to the disk D side by the suspension 3 or the like by a predetermined force. As shown in FIG. 2, the recording and reproducing head floats to a position separated from the disk D by a predetermine distance H by the balance of both forces.

Furthermore, even if the recording and reproducing head 2 receives the wind pressure generated due to the undulation of the disk D, the displacement in the Z direction is absorbed by the suspension 3, and the recording and reproducing head 2 can be displaced around the XY axes by the gimbal 17. Thus, the recording and reproducing head 2 can absorb the wind pressure due to the undulation. For that reason, it is possible to cause the recording and reproducing head 2 to float in a stable state.

Figure 12:
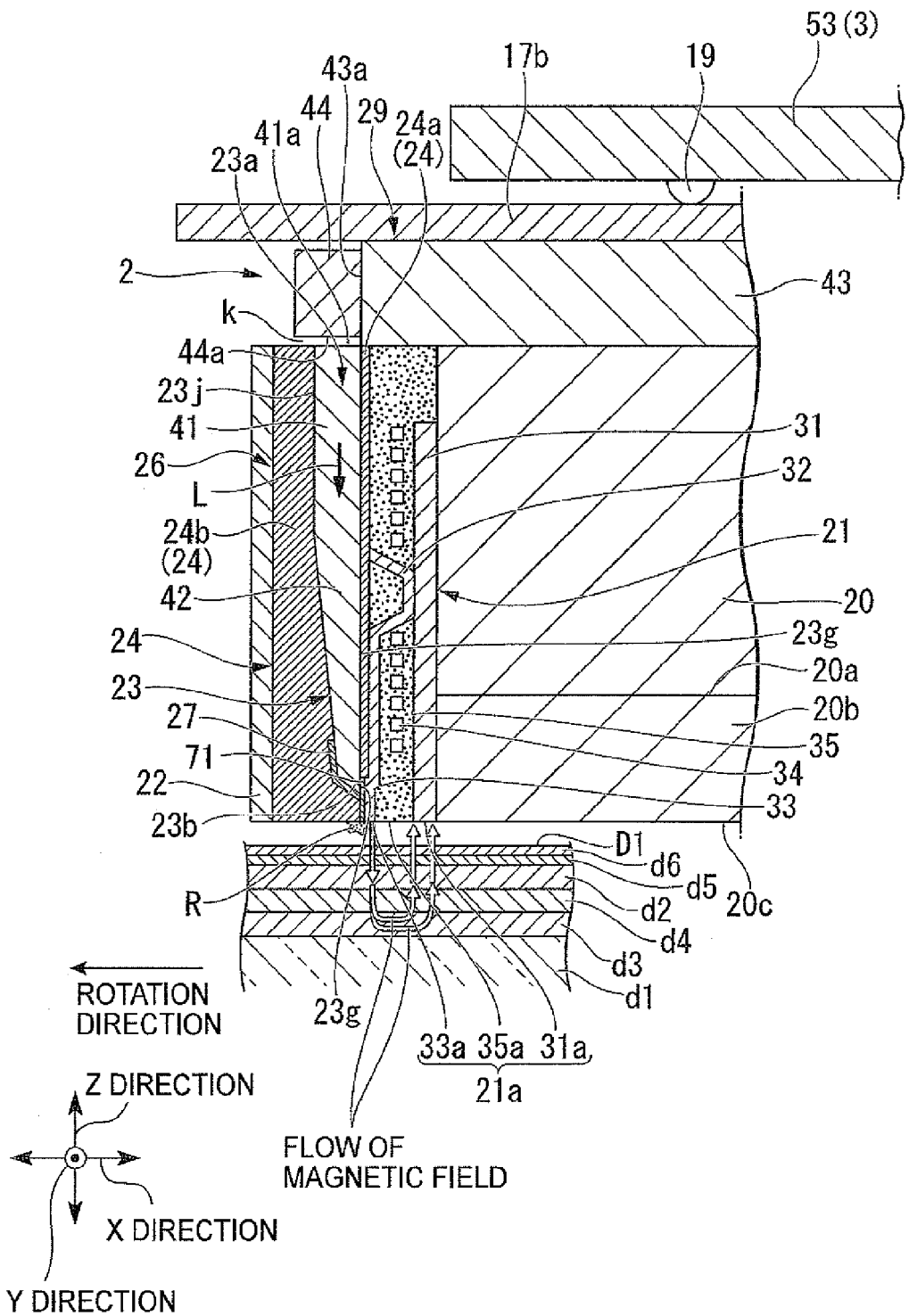
FIG. 12 is an explanatory diagram when recording and reproducing information by an information recording and reproducing device and a diagram corresponding to FIG. 6.
Figure 13:
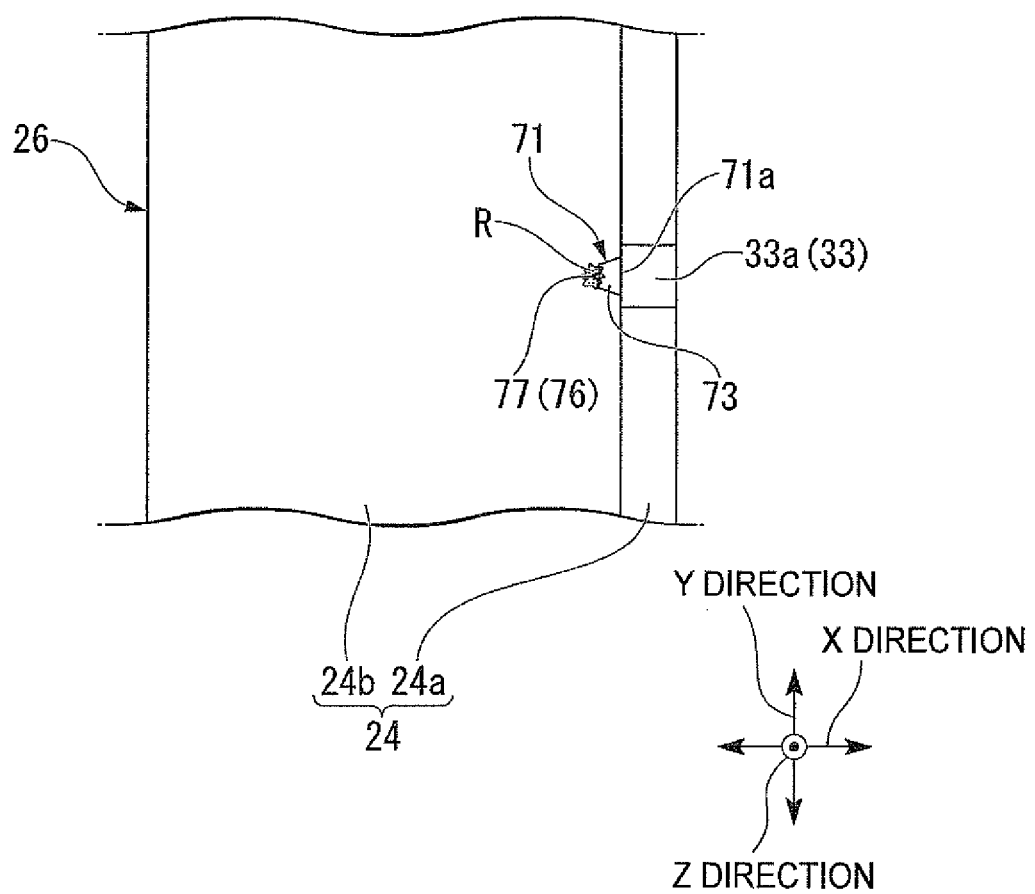
FIG. 13 is an explanatory diagram when recording and reproducing information by an information recording and reproducing device and a diagram corresponding to FIG. 11.

FIGS. 12 and 13 are explanatory diagrams when recording and reproducing information by the information recording and reproducing device, FIG. 12 is a diagram corresponding to FIG. 6, and FIG. 13 is a diagram corresponding to FIG. 11.

Herein, in the case of recording information, as shown in FIGS. 12 and 13, the control portion 8 operates the laser beam source 29 to emit the laser beam L, and supplies the electric current modulated depending on information to the coil 34 to operate the recording element 21.

Firstly, the laser beam L is emitted from the laser beam source 29, and the laser light L is caused to be incident from the upper end surface 41a of the core 23 into the light flux focusing portion 23a of the core 23. The laser beam L propagated in the light flux focusing portion 23a is propagated while repeating the total reflection between the core 23 and the cladding 24 toward the lower end side situated at the disk D side. Particularly, since the cladding 24 comes into close contact with the side surfaces 23k and 23d of the core 23, light does not leak to the outside of the core 23. Thus, it is possible to propagate the introduced laser beam L while drawing the same without wasting to the lower end side and cause the same to be incident in the near-field light generating portion 23b.

At this time, the core 23 is drawn such that the cross sectional area perpendicular to the Z direction is gradually reduced. For that reason, the laser beam L is gradually narrowed as the laser beam L is propagated in the light flux focusing portion 23a, whereby the spot size is reduced.

The laser beam L with the small size is then incident to the near-field light generating portion 23b. The near-field light generating portion 23b is further drawn toward the lower end side, and has a size equal to or less than the wavelength of light. In this case, two side surfaces 23d of the near-field light generating portion 23b are shielded by the light shielding film 27. Thus, the laser beam L incident to the near-field light generating portion 23b is propagated while being reflected by the interface between the light shielding film 27 and the near-field light generating portion 23b without leaking to the second cladding 24b side.

Herein, in the present embodiment, the lower end surface (the side surface 23d) of the core 23 in the near-field light generating portion 23b slopes such that an angle formed between the lower end surface and the side surface 23g becomes an acute angle. Thus, the laser light L is reflected so that the introduction direction of the laser beam L incident to the side surface 23d faces the metal film 71. As a result, for example, it is possible to suppress that the laser light L leaks outward from the lower end surface of the core 23, compared to a case where the lower end surface of the core 23 is formed on the flat surface along the XY direction perpendicular to the extending direction of the core 23. That is, since the laser beam L propagated in the core 23 is effectively incident to the metal film 71, it is possible to ensure a quantity of light incident to the metal film 71 and improve the generation efficiency of the near-field light R.

Moreover, the laser beam L propagated up to the lower end side through the near-field light generating portion 23b is incident to the metal film 71. Then, the surface Plasmon is exited to the metal film 71. The excited surface Plasmon is propagated downward on the metal film 71. Moreover, when the surface Plasmon propagated on the metal surface 71 is propagated up to the extending portion 73, the surface Plasmon becomes the near-field light R having strong light intensity in the top portion 77 of the protrusion portion 76. Moreover, the near-field light R generated in the top portion 77 is propagated downward through the top portion 77, and leaks to the outside in the lower end (the facing surface 26a of the near-field light generating element 26). That is, it is possible to localize the near-field light R between the lower end side of the near-field light generating element 26 and the disk D. Then, the disk D is locally heated by the near-field light R, whereby the coercive force is temporarily lowered.

Meanwhile, when the coil 34 is supplied with the electric current by the control portion 8, since the electric current magnetic field is generated in the magnetic circuit 32 by the principle of electromagnet, it is possible to generate the recording magnetic field of the perpendicular direction to the disk D between the main magnetic pole 33 and the return pole 31. Then, the magnetic flux generated from the main magnetic pole 33 side passes straight through the perpendicular recording layer d2 of the disk D, and reaches the soft magnetic layer d3. As a result, it is possible to perform the recording in the state of causing the magnetization of the perpendicular recording layer d2 to face perpendicularly to the disk surface D1. Furthermore, the magnetic flux reaching the soft magnetic layer d3 returns to the return pole 31 via the soft magnetic layer d3. At this time, when the magnetic flux returns to the return pole 31, there is no influence in the magnetization direction. This is because the area of the return pole 31 facing the disk surface D1 is greater than the main magnetic pole 33, and thus, force, by which the magnetic flux density greatly reverses the magnetization, is not generated. That is, it is possible to perform the recording only at the main magnetic pole 33 side.

As a consequence, it is possible to perform the recording of information by the hybrid magnetic recording method in which the near-field light R cooperates with the recording magnetic fields generated in both magnetic poles 31 and 33. In addition, since the recording is performed by the perpendicular recording method, the recording is hardly affected by the thermal fluctuation phenomenon or the like, and the stable recording can be performed. Thus, the reliability of writing can be enhanced.

Furthermore, in the case of reproducing information recorded on the disk D, when the coercive force of the disk D is temporarily lowered, the reproducing element 22 receives the magnetic field leaking from the perpendicular recording layer d2 of the disk D, and the electric resistance is changed depending of the magnitude thereof. Thus, the voltage of the reproducing element 22 is changed. As a result, the control portion 8 is able to detect a change in magnetic field leaking from the disk D as a change in voltage. Moreover, the control portion 8 is able to perform the reproduction of information recorded on the disk D by performing the reproduction of the signal from the change in voltage.

Method of Manufacturing Recording and Reproducing Head

Figure 14A:
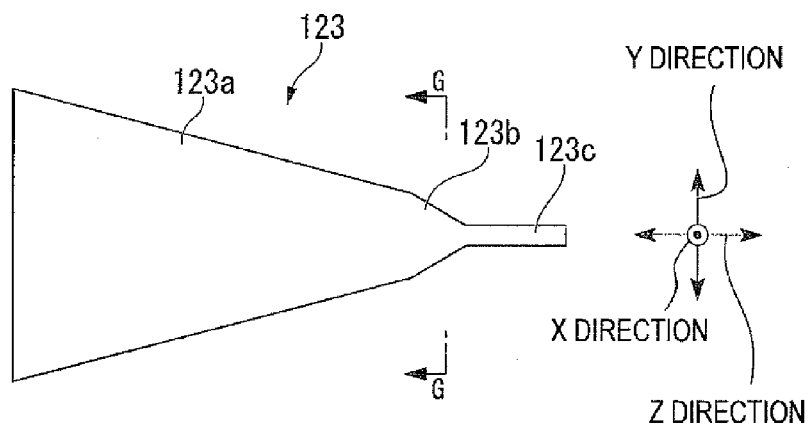
FIGS. 14A to 14C are process diagrams for describing a manufacturing method of a near-field light generating element and a plan view of a core base material.
Figure 14B:
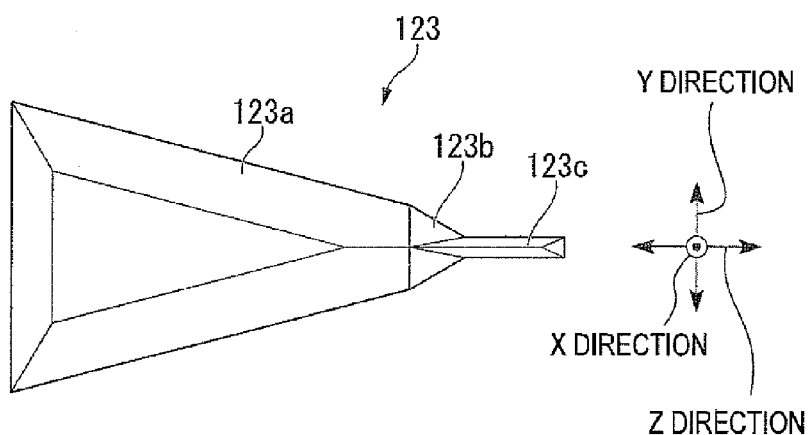
Figure 14C:
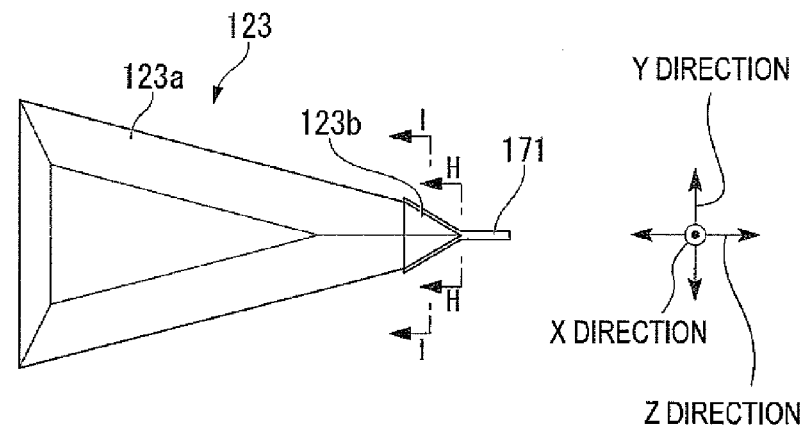
Figure 15A:
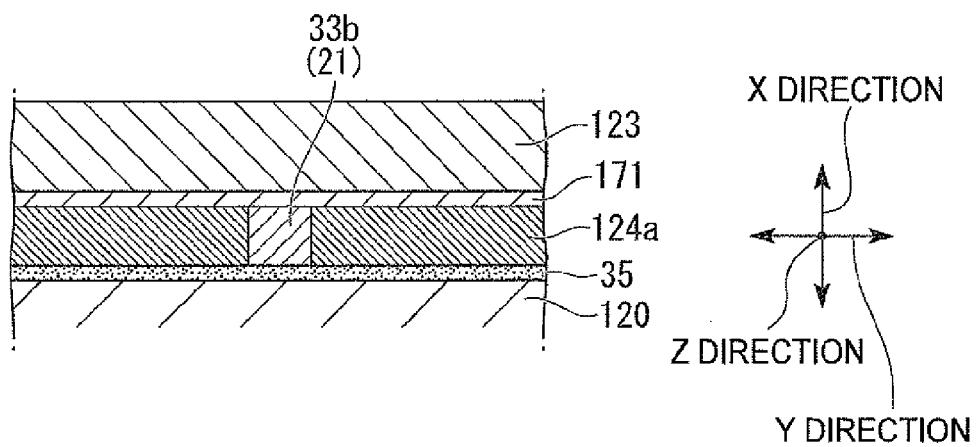
FIGS. 15A to 15C are process diagrams for describing the manufacturing method of the near-field light generating element and a cross-sectional view along a line G-G of FIG. 14A.
Figure 15B:
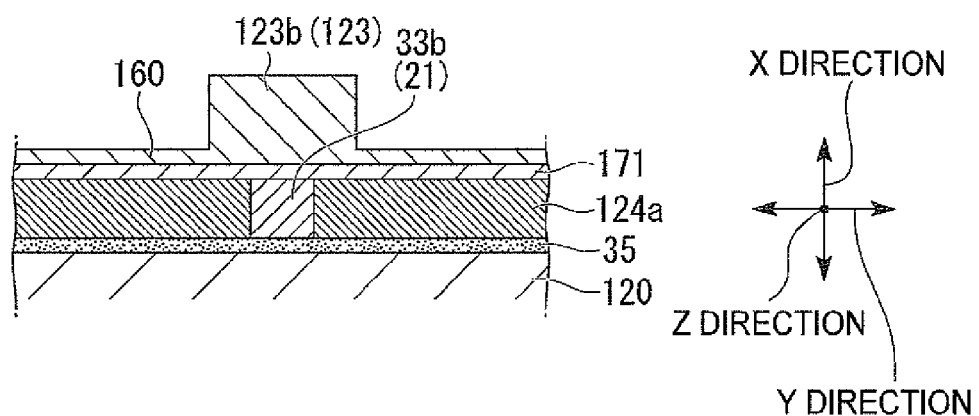
Figure 15C:
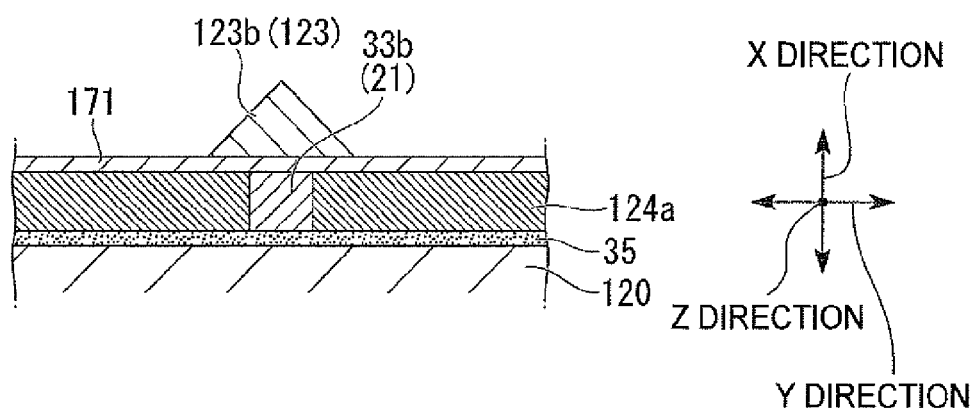

Next, a method of manufacturing the recording and reproducing head 2 having the near-field light generating element 26 mentioned above will be described. FIGS. 14A to 14C are process diagrams for describing a method of manufacturing the near-field light generating element and are plan views of a core base material. Furthermore, FIGS. 15A to 15C are cross-sectional views along a line G-G of FIG. 14A. In addition, in the description mentioned below, in the manufacturing process of the recording and reproducing head 2, a manufacturing process of near-field light generating element will mainly and specifically be described.

In the present embodiment, a substrate 120 (for example, ALTiC (altic) and the like) with a plurality of sliders 20 extended along the X direction and the Y direction is prepared, the recording element 21, the near-field light generating element 26, and the reproducing element 22 are sequentially formed on each forming region of the recording and reproducing head 20 in the substrate 120, respectively, and then, the dicing is performed for each forming region of the recording and reproducing head 2, thereby manufacturing the recording and reproducing head 2.

Firstly, as shown in FIG. 15A, the recording element 21 (see FIG. 6) is formed on the substrate 120 and is molded by the insulator 35. After that, the base material of the near-field light generating element 26 is formed on the insulator 35 (a first cladding forming process and a core forming process). Specifically, a first cladding base material 124a, a metal film base material 171 (for example, approximately 20 nm), and a core base material 123 (in the order of several μm) are sequentially formed on the substrate 120 (the insulator 35). In addition, after forming the respective base materials 124a, 171, and 123, the respective surfaces are polished by a CMP (Chemical Mechanical Polishing) or the like to form a flat surface.

Furthermore, it is preferable to pattern the metal film base material 171 in advance so as to remain only in a predetermined region after being formed on the whole surface on the first cladding base material 124a. In this case, in the present embodiment, in the Z direction the metal film base material is patterned so as to remove the metal film base material 171 of a region corresponding to the light flux focusing portion 23a (see FIG. 6) at least in the core base material 123. In this case, in the region corresponding to the near-field light generating portion 23b, the metal film base material 171 is interposed between the core base material 123 and the first cladding base material 124a, and in other regions (for example, a region corresponding to the light flux focusing portion 23a), the core base material 123 comes into close contact with the first cladding base material 124a. As a result, in a region at least corresponding to the light flux focusing portion 23a, the core base material 123 comes into close contact with the first cladding base material 124a having adhesion property to the core base material 123 higher than that of the metal film base material 171. As a result, it is possible to suppress the film peeling during manufacturing. In addition, it is more preferable to pattern the metal film base material 171 so as to remain only in the forming region of the metal film 71 mentioned above.

Next, as shown in FIG. 15B, a mask pattern (not shown), in which a region needed to remove the core base material 123 is opened, is formed on the core base material 123 by the use of photolithography technique, and a reactive ion etching (RIE) is performed via the mask pattern (a first patterning process). As a result, the core base material 123 of the region with the opened mask pattern is vertically (along the X direction) etched, and a rectangular core base material 123 when viewed in the X direction is formed. Furthermore, as shown in FIGS. 14A and 15B, the core base material 123 includes a first base material 123a formed in a trapezoidal shape tapered from the upper end side to the lower end side when viewed in the X direction, a second base material 123b which is further tapered downward from the lower end side of the first base material 123a, and a third base material 123c which is extended downward from the lower end side of the second base material 123b by a certain width. In addition, in the first patterning process, it is preferable that the core base material 123 of the region with the opened mask pattern remains slightly without being completely removed (see a remaining portion 160 in FIG. 15B).

Next, as shown in FIGS. 14B and 15C, the core base material 123 and the metal film base material 171 are subjected to a sputter etching in plasma such as argon (Ar) (a second patterning process). In the second patterning process, when performing the sputter-etching of the core base material 123 having the rectangular cross section, each corner portion of the core base material 123 is selectively etched, and the slope surface is formed. Moreover, upon further continuing the etching in this state, the slope surface is etched while maintaining a certain degree to the bottom surface (corresponding to the side surface 23g of FIG. 7). In addition, in the first base material 123a, the upper side is the trapezoidal portion 41 of the light flux focusing portion 23a, the lower side is the triangular portion 42 of the light flux focusing portion 23a, and the second base material 123b is the near-field light generating portion 23b. In this case, each corner portion of both sides in the Y direction is removed, and the third base material 123c remains in a triangular shape when viewed from the Z direction.

Moreover, in the second patterning process, upon continuing the etching in the second patterning process, the width (the width in the Y direction) and the height (the height in the X direction) of the core base material 123 are reduced while maintaining a similar shape, and the external form of the core base material 123 is reduced. Then, the metal film base material 171 covered by the core base material 123 is exposed.

Figure 16A:
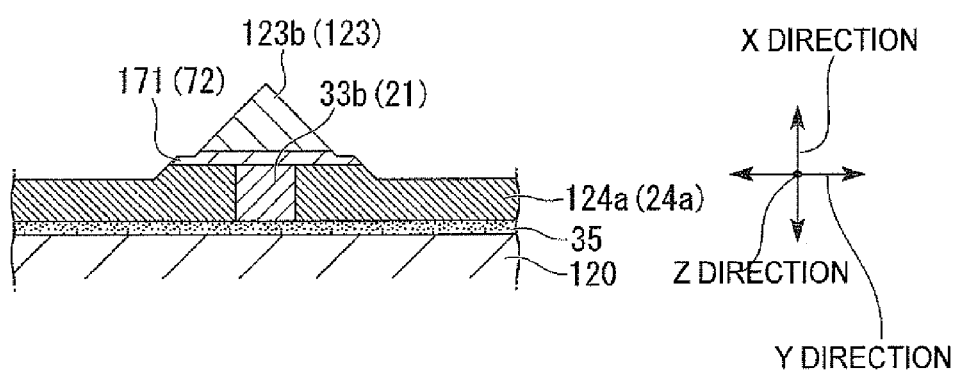
FIGS. 16A and 16B are process diagrams for describing the manufacturing method of the near-field light generating element.
Figure 16B:
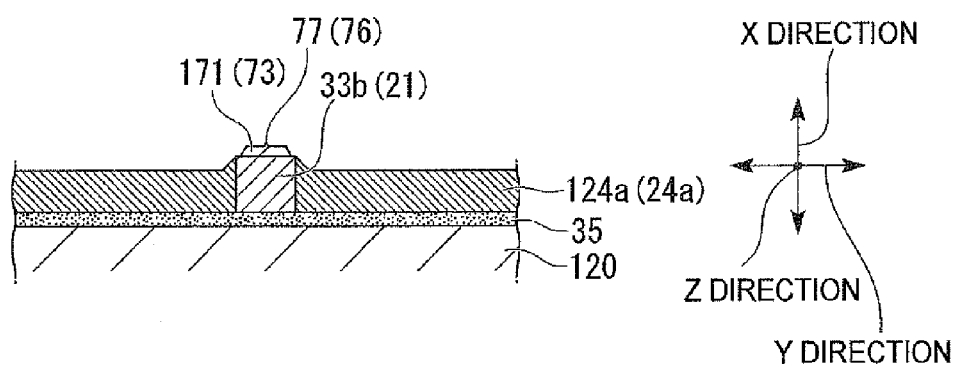

FIGS. 16A and 16B are process diagram for describing a method of manufacturing the near-field light generating element, FIG. 16A is a cross-sectional view along a line H-H of FIG. 14C, and FIG. 16B is a cross-sectional view along a line I-I of FIG. 14C.

As shown in FIGS. 14C, 16A and 16B, upon further continuing the sputter etching from the state where the metal film base material 171 is exposed, the core base material 123 is etched while maintaining the similar shape, and each corner portion of the metal film base material 171 is etched.

Herein, since the material (for example, quartz) used in the core base material 123 of the core 23 mentioned above is different from the material (for example, gold) used in the metal film base material 171 (metal film 71), there is a difference in etching rate when performing the sputter etching. In the case of the present embodiment, the material used in the core base material 123 has the etching rate greater than that of the material used in the metal film base material 171, and thus, the core base material 123 is positively etched compared to the metal film base material 171.

For that reason, as shown in FIGS. 14C and 16A, in a region where the core base material 123 overlaps with the metal film base material 171 in the X direction, in the region of the second base material 123b, the metal film base material 171 is exposed to an outer peripheral edge (both side in the Y direction) of the second base material 123b. As a result, in the region of the second base material 123b, the base material 72 having the width in the Y direction wider than that of the second base material 123b. After that, by further continuing the sputter etching, the base material 72 is gradually etched from the portion (a corner of the outer peripheral edge) exposed from the second base material 123b. Thus, as shown in FIG. 9, the first base portion 74 having the side surface 74a parallel to the side surface 23d of the near-field light generating portion 23b and the second base portion 75 having the side surface 75a on the same plane as the side surface 23d are formed via the step portion 78.

Meanwhile, as shown in FIGS. 14C and 16B, in the region of the third base material 123c (see FIG. 14C), the metal film base material 171 is exposed from the outer peripheral edge of the third base material 123c. After that, by further performing the sputter etching, the metal film base material 171 is gradually etched from the portion (the corner portion of the outer peripheral edge) exposed from the third base material 123c toward the inner side. Moreover, finally, the third base material 123c is completely removed, whereby only the metal film base material 171 covered by the third base material 123c remains. As a result, in the region of the third base material 123c, the extending portion 73 extended by the same width as that of the third base material 123c is formed. At this time, the metal film base material 171 exposed form the third base material 123c is gradually etched from the corner portion of the outer peripheral edge toward the inner side, in the extending portion 73, a portion covered by the third base material 123c to the last remains as the protrusion portion 76 having the top portion 77.

In this manner, the metal film 71 and the core 23 are collectively formed on the first cladding base material 124a (the first cladding 24a).

Figure 17A:
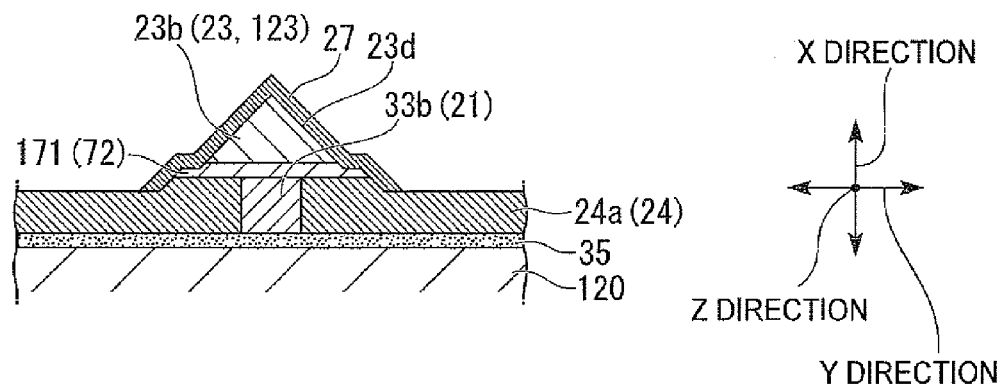
FIGS. 17A and 17B are process diagrams for describing the manufacturing method of the near-field light generating element and a cross-sectional view corresponding to a line I-I of FIG. 14C.
Figure 17B:
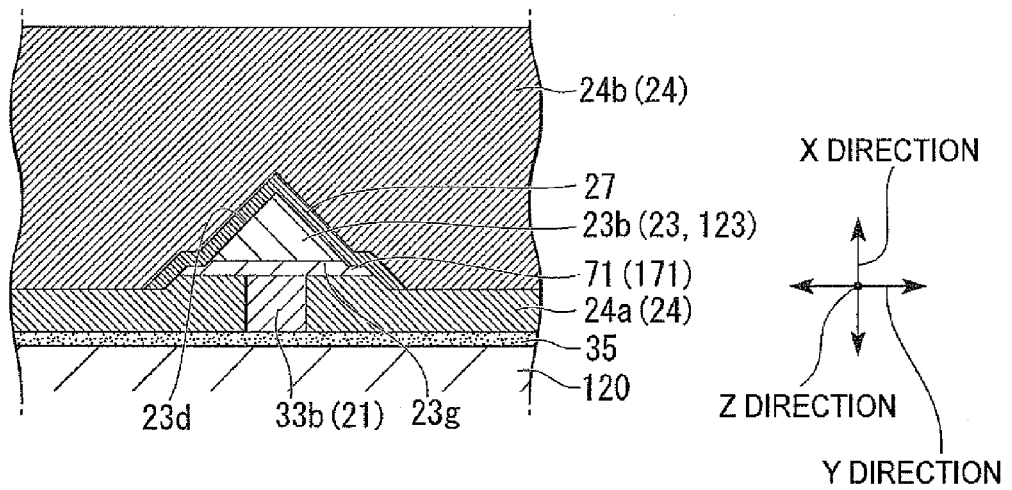

FIGS. 17A and 17B are cross-sectional views corresponding to a line I-I of FIG. 14C.

Next, as shown in FIG. 17A, the light shielding film 27 is formed so as to cover the core 23 (the core base material 123) (a light shielding film forming process). Specifically, the patterning is performed so that the light shielding film 27 remains in the region corresponding to the near-field light generating portion 23b in the side surface 23d of the core 23.

Moreover, as shown in FIG. 17B, the second cladding 24b is formed so as to cover the core 23 and the light shielding film 27 (a second cladding forming process). After that, the surface of the second cladding 24b is polished by the CMP or the like to form the flat surface. Moreover, the reproducing element 22 is formed on the second cladding 24b. As a result, the recording element 21, the near-field light generating element 26, and the reproducing element 22 are formed on the substrate 120.

Next, the substrate 120 is diced along the Y direction, thereby forming a bar (not shown) with a plurality of sliders 20 extended along one direction (the Y direction). Thereafter, the side surface (cross-sectional surface) of the diced bar is polished (a polishing process). As a result, along with the substrate 120, both end surfaces in the Z direction in the near-field light generating element 26 are formed on the flat surface.

After that, the bar is cut along the Z direction so as to obtain a size for each slider 20 (a slider process).

Finally, the laser beam source 29 is mounted on the upper surface of the slider 20. Specifically, the semiconductor laser chip 44 is placed so as to face the upper end surface 41a of the trapezoidal portion 41 of the core 23 in the state of causing the exit side end surface of the laser beam source L to face downward.

In this manner, the recording and reproducing head 2 having the near-field light generating element 26 mentioned above is completed.

In this way, in the present embodiment, a configuration has been adopted in which the extending portion 73 extended from the base portion 72 of the metal film 71 to the lower part rather than the core 23 is formed, and the extending portion 73 is formed with the protrusion portion 76 having the top portion 77.

According to the configuration, by forming the protrusion portion 76 in the extending portion 73, the surface Plasmon excited to the base portion 72 of the metal film 71 is propagated onto the metal film 71, and is converted to the near-field light R having strong light intensity in the top portion 77 of the protrusion portion 76. For that reason, it is possible to generate the near-field light R narrower than the width of the interface between the extending portion 73 and the core 23 when viewed from the Z direction.

Moreover, since the information recording and reproducing device 1 (the recording and reproducing head 2) of the present invention includes the near-field light generating element 26 mentioned above, the recording and reproducing of information can be performed accurately and with high density, and the high quality can be promoted.

Furthermore, by forming the light shielding film 27 so as to cover the side surface 23d of the core 23, the laser beam L incident to the core 23 is propagated while being reflected by the interface between the light shielding film 27 and the core 23 without leaking to the cladding 24 side. As a result, it is possible to effectively cause the laser beam to be incident to the metal film 71, whereby the generation efficiency of the near-field light R can be improved.

In addition, in the present embodiment, a configuration has been adopted in which, when collectively patterning the core 23 and the metal film 71, the protrusion portion 76 is formed by the use of a difference in etching rate due to a difference in constituent material between the core 23 and the metal film 71.

According to the configuration, since the metal film 71 can be formed in a minute pattern only by the management of the etching time, there is no need to use an expensive device in the formation of the minute pattern of the core 23 and the metal film 71. As a result, by suppressing an increase in manufacturing cost, the spot size of the near-field light R can be reduced.

Furthermore, by collectively patterning the core 23 and the metal film 71, unlike a case where the core 23 and the metal film 71 are patterned by separate processes, respectively, it is possible to accurately position the metal film 71 and the core 23. Thus, since it is possible to cause the laser beam L propagated up to the lower end side of the core 23 to be incident to the base portion 72 of the metal film 71 without omission, and thus, the generation efficiency of the near-field light R can be improved.

In addition, by forming the protrusion portion 76 in the extending portion 73 extended downward rather than the core 23, regardless of the shape of the core 23 and the position accuracy of the core 23, only the extending portion 73 (the protrusion portion 76) can be formed in a desired shape. Thus, the manufacturing thereof is easy, and a degree of freedom of the design can also be improved.

In addition, a case has been described where the metal film 71 of the embodiment mentioned above forms the protrusion portion 76 having the top portion 77 in the extending portion 73, like the metal film 71 shown in FIG. 18, the extending portion 173 itself may be formed in a triangular shape having a top portion 177 tapered as facing forward when viewed from the Z direction, without being limited thereto.

The extending portion 173 may be formed by continuing the sputter etching until the corner portion of the extending portion 73 is completely removed in the second patterning process in the first embodiment mentioned above.

Second Embodiment

Figure 19:
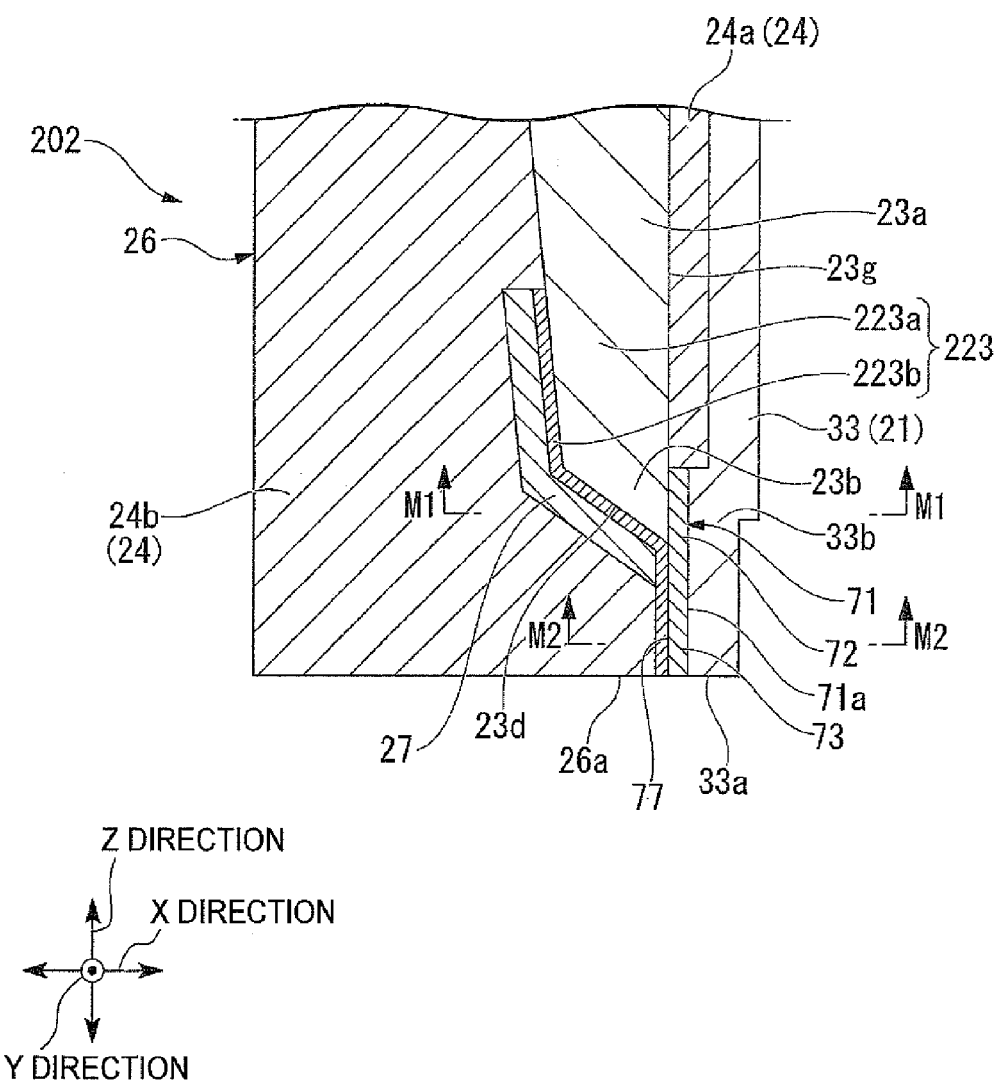
FIG. 19 is an enlarged cross-sectional view of a front side of a recording and reproducing head of a second embodiment.
Figure 20A:
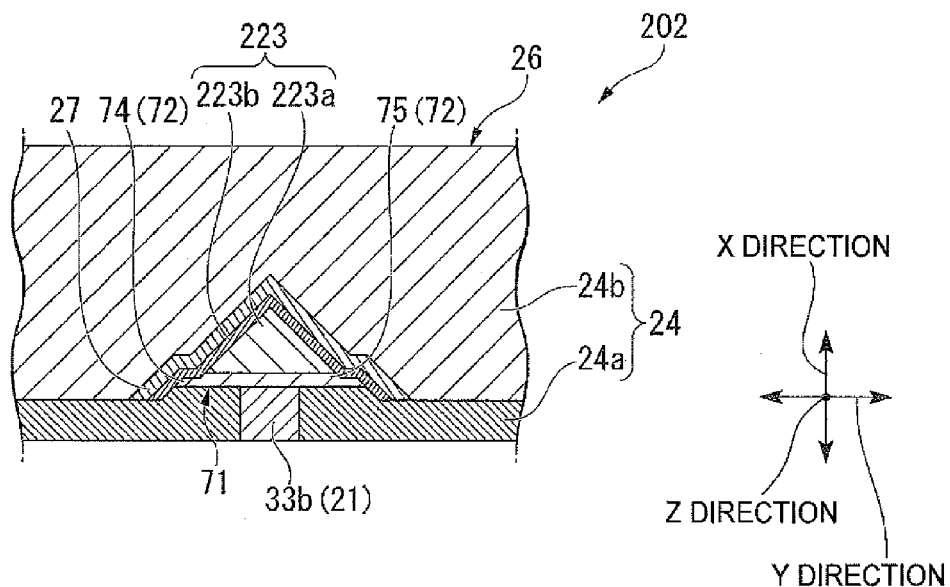
FIG. 20A is a cross-sectional view along a line M1-M1 of FIG. 19.
Figure 20B:
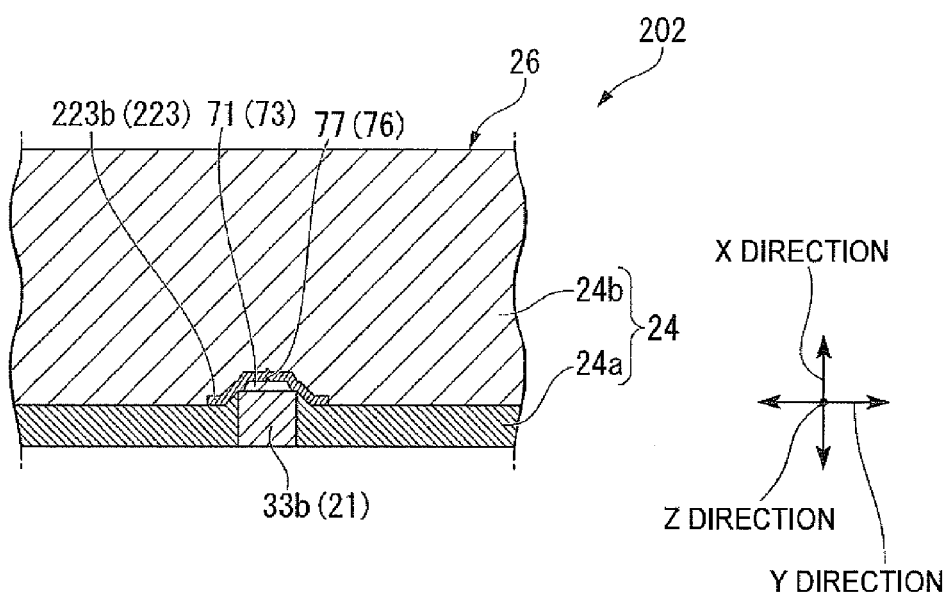
FIG. 20B is a cross-sectional view along a line M2-M2 of FIG. 19.

Next, a second embodiment of the present invention will be described. FIG. 19 is an enlarged cross-sectional view of a front side of a recording and reproducing head in a second embodiment, FIG. 20A is a cross-sectional view along a line M1-M1 of FIG. 19, and FIG. 20B is a cross-sectional view along a line M2-M2 of FIG. 19. In addition, in the description as below, the same configurations as those of the first embodiment mentioned above will be denoted by the same reference numerals, and the descriptions thereof will be omitted. The present embodiment is different from the first embodiment mentioned above in that the lower end side of the core 23 has a two-layer structure.

As shown in FIGS. 19, 20A and 20B, in a recording and reproducing head 202 (the near-field light generating element 26) of the present embodiment, a lower end side of a core 223 includes a first core 223a of a triangular shape when viewed from the Z direction, and a second core 223b covering the first core 223a from the opposite side of the metal film 71. In this case, the first core 223a has the same configuration as that of the core 23 of the first embodiment mentioned above, and the upper end side thereof is exposed on the same plane as the upper surface of the slider 20 and is exposed toward the outside. Meanwhile, the lower end side of the first core 223a (the near-field light generating portion 23b) is situated above the ABS 20c of the slider 20, is covered by the cladding 24, and is not exposed to the outside.

The second core 223b is formed so as to cover the first core 223a and the metal film 71 from both sides along the front part and the Y direction. For that reason, the outer end portion of the Y direction in the second core 223b when viewed from the Z direction is situated outside the outer end portion of the first base portion 74. That is, the width of the entire core 223 of the present embodiment in the Y direction is formed to be wider than the width of the first base portion 74.

Furthermore, the second core 223b is formed so as to cover the lower end side of the first core 223a in the Z direction, and constitutes the lower end side of the light flux focusing portion 23a and the near-field light generating portion 23b together with the first core 223a. In addition, the second core 223b is extended downward from the lower end side of the first core 223a. Specifically, the second core 223b is extended so as to cover the extending portion 73 of the metal film 71 from the portion between the light shielding film 27 and the metal film 71, is formed on the same plane as the ABS 20c of the slider 20, and is exposed to the outside.

In addition, the forming region of the second core 223b is not limited to the range mentioned above but may be formed so as to cover the entire first core 223a, and the lower end position thereof may be formed in the same position as the lower end position of the first core 223a. Furthermore, the second core 223b can be formed by patterning the core base material so as to cover the first core 223a and the metal film 71 between the second patterning process (see FIG. 16) and the light shielding film forming process (see FIG. 17) mentioned above.

According to the configuration, by forming the second core 223b so as to cover the first core 223a, the width of the entire cores 223 (the first core 223a and the second core 223b) in the Y direction can be formed to be wider than the width of the metal film 71 in the Y direction. For that reason, after suppressing a decline in propagation efficiency of the laser beam L propagated in the core 23, a reduction in spot size of the near-field light R can be promoted. As a result, after ensuring the quantity of light, the spot size of the near-field light R can be reduced, and thus, the disk D can be more locally heated.

In addition, the first core 223a and the second core 223b may be formed by the same material and may be formed by materials from each other. As a combination of the different material, a combination is preferable in which the refractive index is gradually increased from the cladding 24 to the second core 223b and the first core 223a (the refractive index is increased in the sequence of the cladding 24, the second core 223b, and the first core 223a). According to the configuration, since the laser beam L totally reflected on the interface between the second core 223b and the cladding 24 can be gradually focused toward the center (the first core 223a), the propagation efficiency of the laser light L can be improved.

Modified Example

Figure 21A:
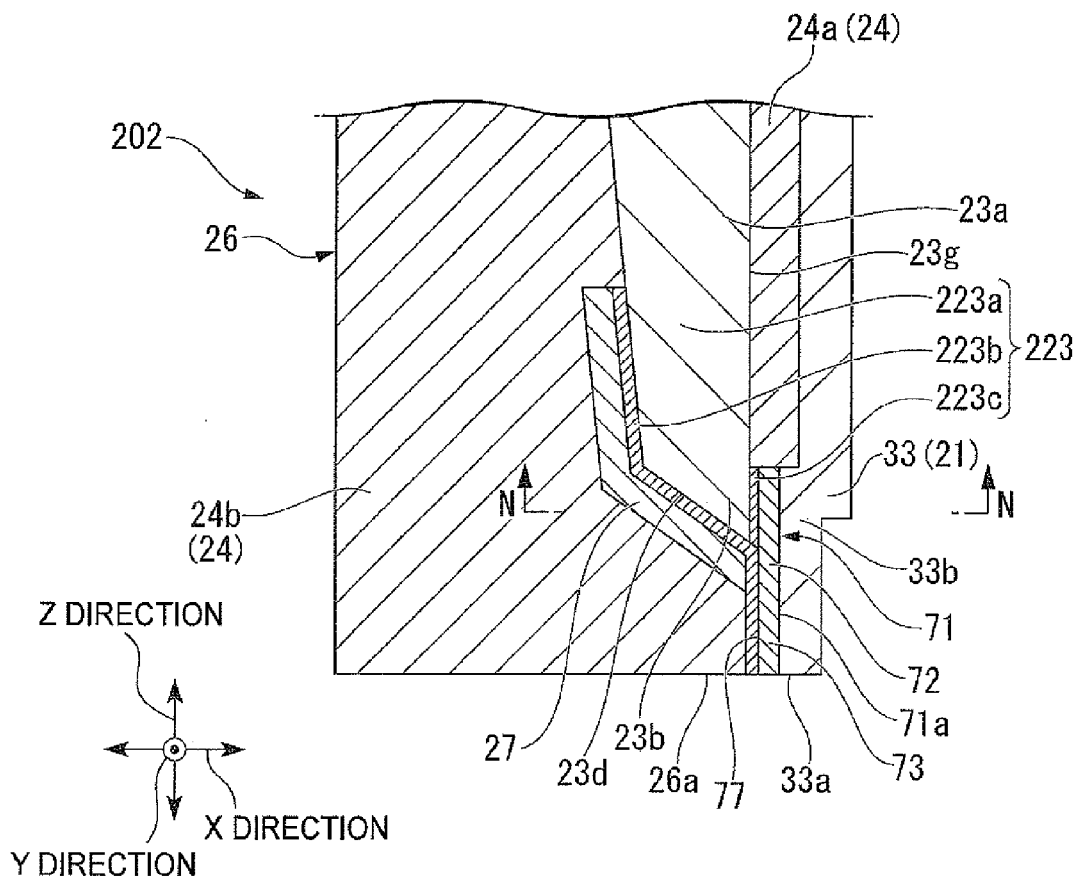
FIG. 21A is an enlarged cross-sectional view of a front side of a recording and reproducing head showing a modified example of the second embodiment.
Figure 21B:
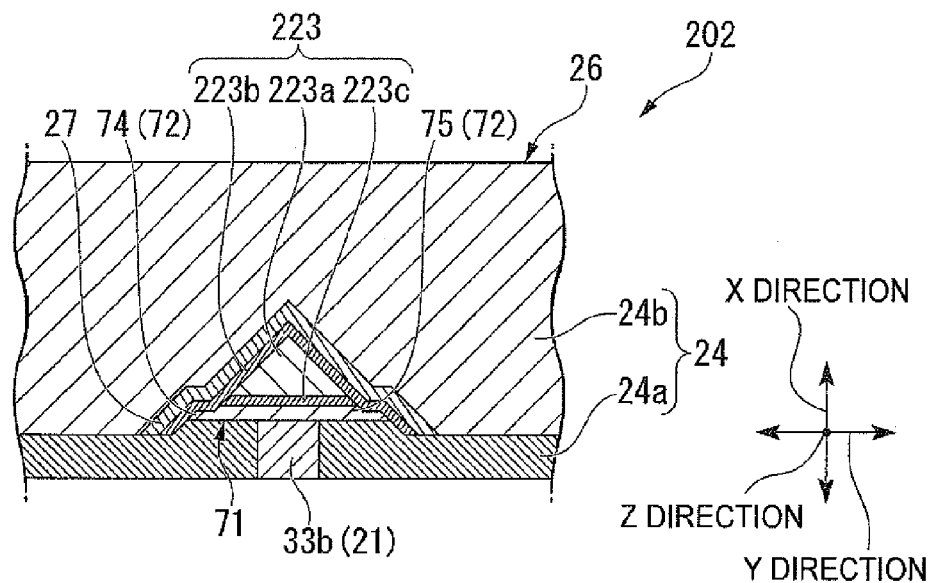
FIG. 21B is a cross-sectional view along a line N-N of FIG. 21A.

FIG. 21A is an enlarged cross-sectional view of a recording and reproducing head showing a modified example of the second embodiment, and FIG. 21B is a cross-sectional view along a line N-N of FIG. 21A.

In the embodiment mentioned above, a configuration has been described in which the second core 223b covering the front side of the first core 223a is provided. However, in addition to this, a configuration may be adopted in which a third core 223c is provided between the first core 223a and the metal film 71. Specifically, the third core 223c is formed of a material having the refractive index smaller than that of the first core 223a and is disposed between the side surface 23g of the near field light generating portion 23b and the base portion 72 of the metal film 71 in the first core 223a. Furthermore, the external form of the third core 223c is formed to be equal to that of the near field light generating portion 23b when viewed from the X direction. Thus, the lower end surfaces (for example, the side surface 23d mentioned above) of the first core 223a and the third core 223c are placed on the same plane, and the second core 223b mentioned above is disposed so as to cover the lower end surfaces.

Figure 22:
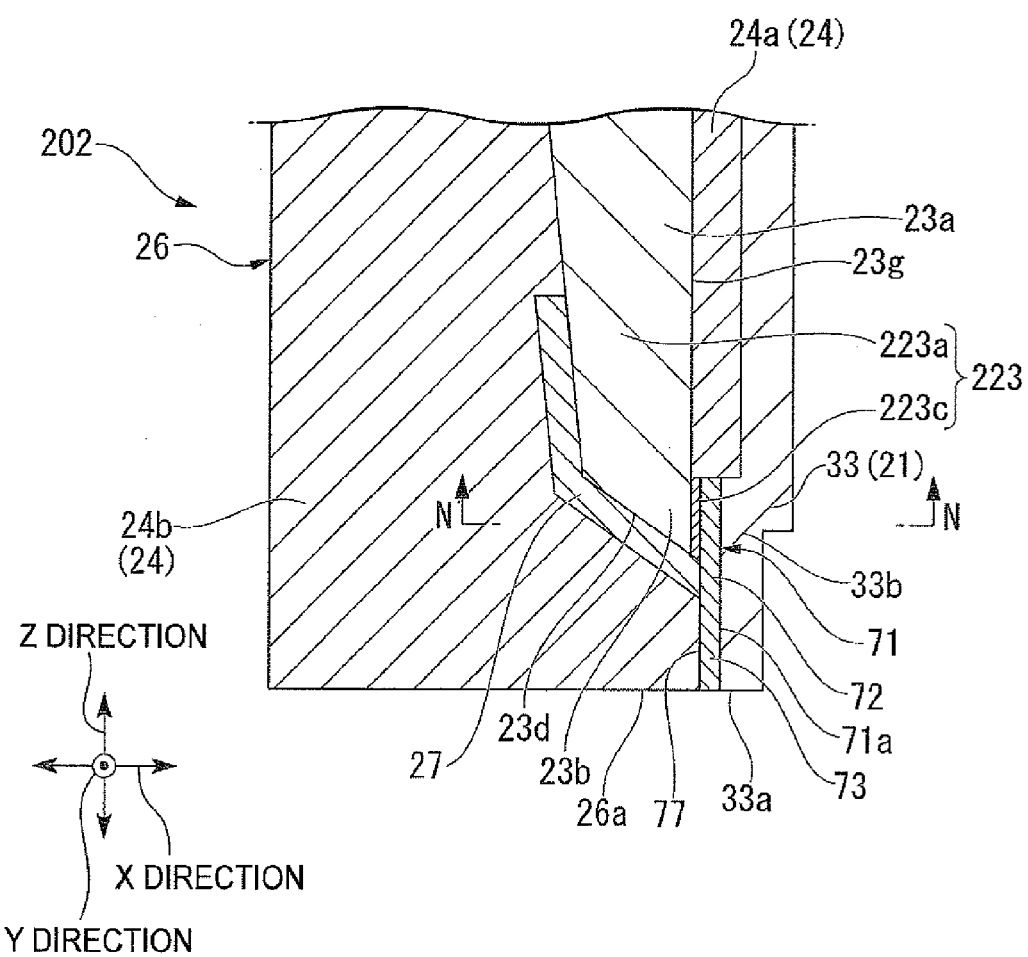
FIG. 22 is an enlarged cross-sectional view of the front side of the recording and reproducing head showing a modified example of the second embodiment.

According to the configuration, it is possible to realize a so-called automatic arrangement in which the first core 223a, the third core 223c having the refractive index smaller than that of the first core 223a, and the metal film 71 are sequentially placed along the Y direction. In this manner, in the near-field light generating element 26 using the automatic arrangement, since the third core 223c having the smaller refractive index smaller than that of the first core 223a functions as a buffering portion between the first core 223a and the metal film 71, it is possible to excite the surface Plasmon to the metal film 71 without greatly affecting the wave number of the laser beam L propagated through the first core 223a. In addition, the forming region of the third core 223c is not limited to the range mentioned above. Furthermore, as shown in FIG. 22, only the third core 223c may be provided without providing the second core 223b.

Third Embodiment

Figure 23:
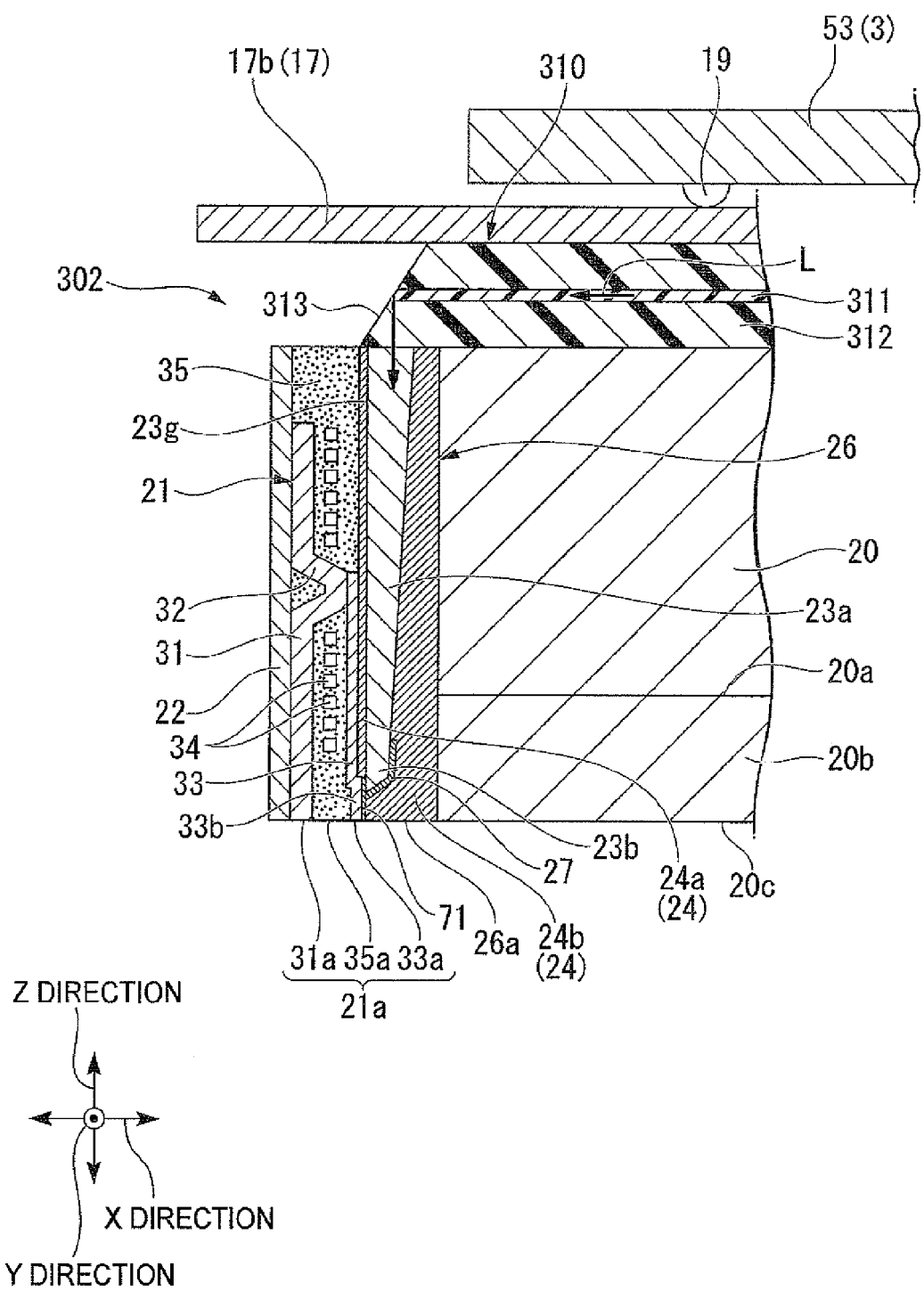
FIG. 23 is an enlarged cross-sectional view of side of an outflow end side of the recording and reproducing head in a third embodiment.
Figure 24:
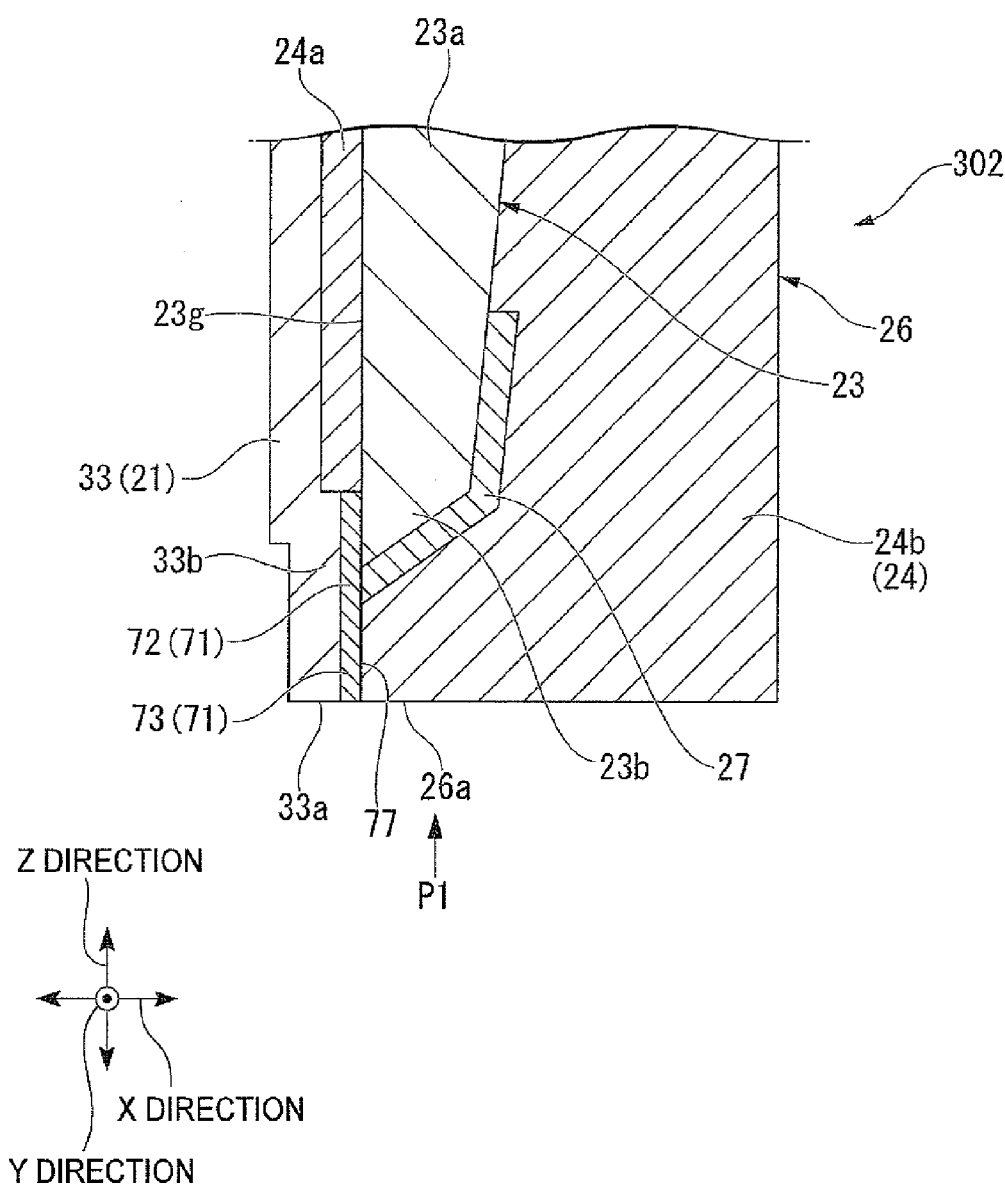
FIG. 24 is an enlarged cross-sectional view of the front side of the recording and reproducing head.

Next, a third embodiment of the present invention will be described. FIG. 23 is an enlarged cross-sectional view of a side surface of an outflow end side of a recording and reproducing head in a third embodiment, and FIG. 24 is an enlarged cross-sectional view of a front side of the recording and reproducing head. Furthermore, FIG. 25 is a view taken from a direction of an arrow P1 of FIG. 24.

Figure 25:
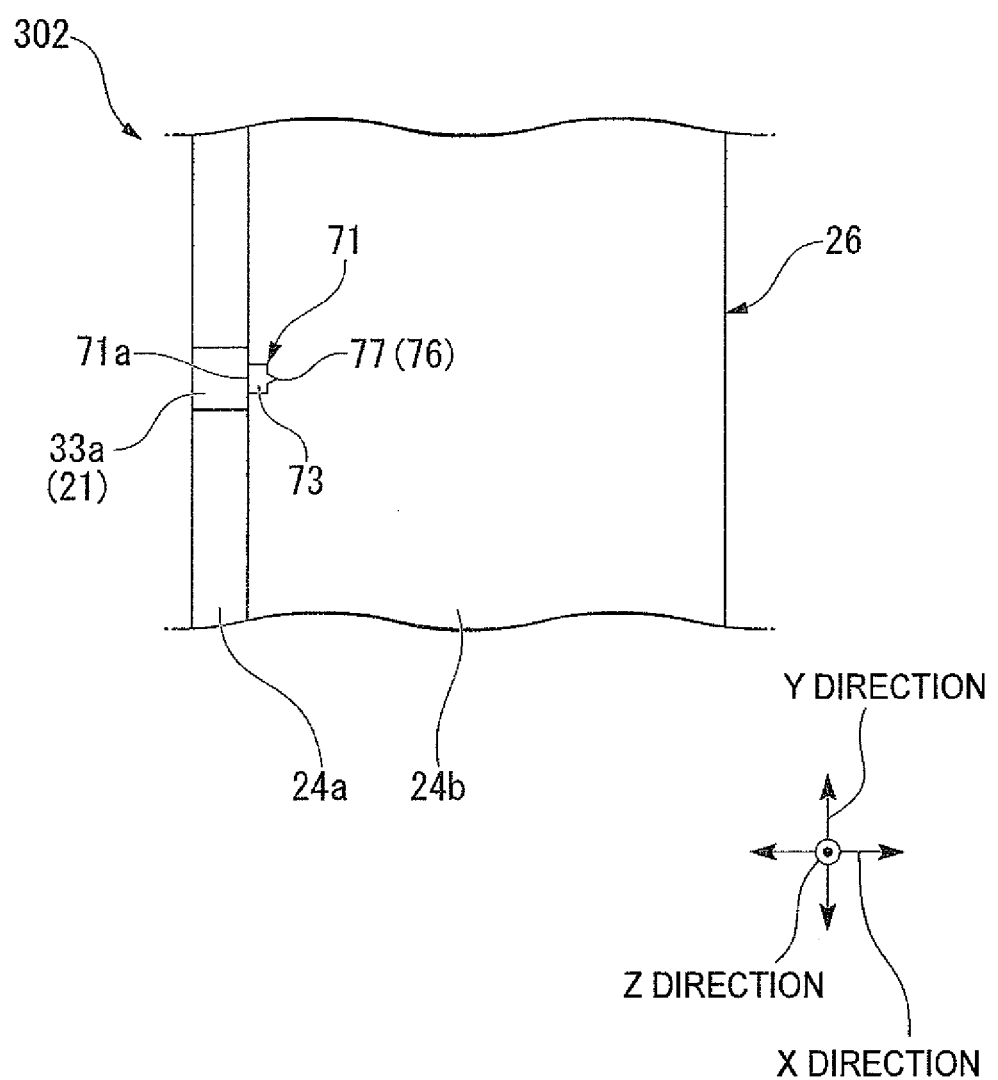
FIG. 25 is a diagram taken from a direction of an arrow P1 of FIG. 24.

As shown in FIGS. 23 to 25, in a recording and reproducing head 302 of the present embodiment, the near-field light generating element 26, the recording element 21, and the reproducing element 22 are sequentially placed on the front end surface of the slider 20 along the X direction.

The near-field light generating element 26 is provided such that the front and rear direction is reversed to the core 23 of the first embodiment. Specifically, the core 23 is tapered from left and right both ends (both ends of the Y direction) of the side surface 23g situated at the front toward the rear part (the slider 20), the front side of the core 23 is covered by the first cladding 24a, and the rear side thereof is covered by the second cladding 24b. Moreover, the metal 71 is formed on the side surface 23g of the near field light generating portion 23b in the core 23 so as to be extended downward.

Furthermore, the recording element 21 has the same configuration as that of the first embodiment, and the tip portion 33b of the main magnetic pole 33 is placed on the front end surface of the metal film 71. Moreover, the reproducing element 22 is formed on the return pole 31 of the recording element 21.

Furthermore, in the present embodiment, an optical waveguide 310 is provided on the upper surface of the slider 20, and the laser beam L emitted from a laser beam source (not shown) is incident to the near-field light generating element 26 (the core 23) via the optical waveguide 310. In addition, in the case of the present embodiment, the laser beam source is, for example, mounted on the terminal substrate 55 mentioned above, and is adapted to perform the propagation of the laser beam L between the terminal substrate 55 and the near-field light generating element 26 by the optical waveguide 310.

The optical waveguide 310 has a core 311 which guides the laser beam L emitted from the laser beam source by the total reflection condition, and a cladding 312 which is formed of a material having the refractive index lower than that of the core 311 and comes into close contact with the core 311 to seal the core 311. A tip surface of the optical waveguide 310 is an obliquely cut mirror surface 313, and reflects the laser beam L propagated up to the mirror surface 313 so that the direction thereof is changed by about 90°. As a result, the laser beam L reflected by the mirror surface 313 is introduced into the core 311. In addition, the mirror surface 313 may have a configuration in which a reflection plate formed of aluminum is formed in a region including at least the core 311 by a vapor deposition method or the like.

According to the configuration, after bringing the metal film 71 and the main magnetic pole 33 into close contact with each other on the front end surface of the slider 20, the near-field light generating element 26, the recording element 21, and the reproducing element 22 are placed along the rotation direction of the disk D. In this case, the disk D is firstly heated by the near-field light R generated from the near-field light generating element 26, and then passes through the bottom of the recording element 21 in the state where the holding force certainly declines. Thus, it is possible to smoothly and accurately the recording onto the disk D.

Modified Example

Figure 26:
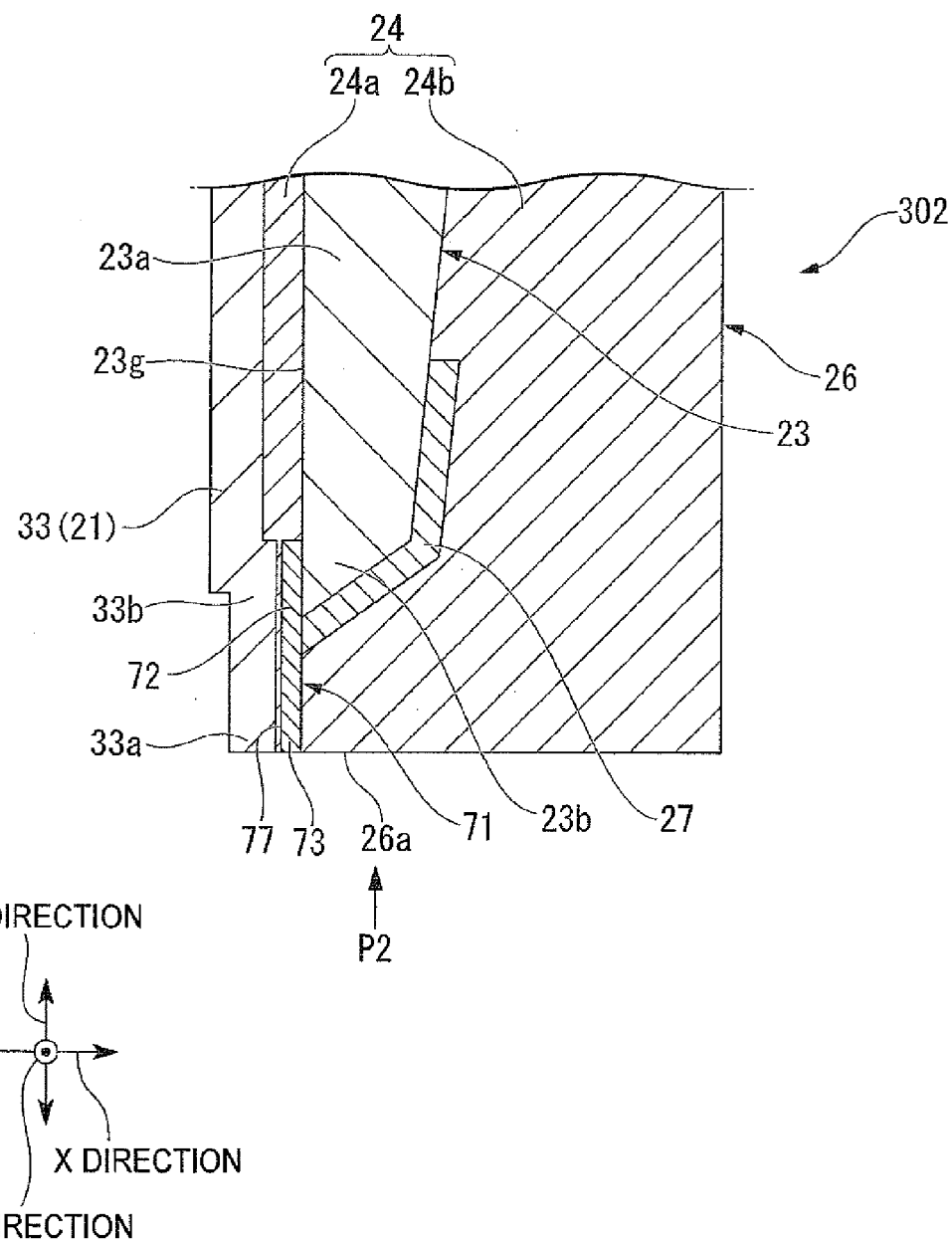
FIG. 26 is an enlarged view of a front side of a recording and reproducing head showing a modified example of a third embodiment.
Figure 27:
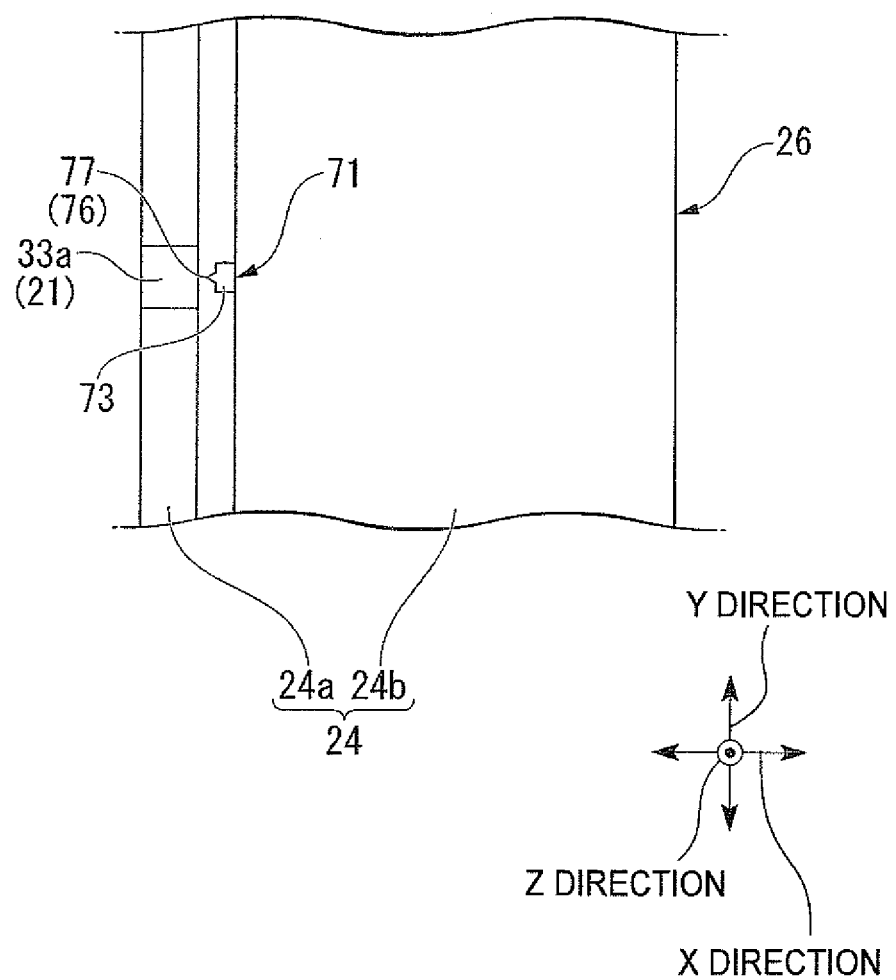
FIG. 27 is a diagram taken from a direction of an arrow P2 of FIG. 26.

FIG. 26 is an enlarged cross-sectional view of a front side of a recording and reproducing head showing a modified example of a third embodiment, and FIG. 27 is a view taken from a direction of an arrow P2 of FIG. 26.

In the embodiments mentioned above, a configuration has been described in which the protrusion portion 76 of the metal film 71 is projected toward the core 23, but, as shown in FIGS. 26 and 27, a configuration may be adopted in which the metal film 71 is projected to the opposite side of the core 23, that is, to the main magnetic pole 33 side, without being limited thereto.

According to the configuration, it is possible to realize a so-called Kretschmann arrangement in which the core 23 (the near field light generating portion 23b), the metal film 71, and the first cladding 24a having the refractive index smaller than that of the core 23 are sequentially placed along the X direction. In this manner, in the near-field light generating element 26 using the Kretschmann arrangement, when the laser beam L propagated through the core 23 is incident to the metal film 71, the surface Plasmon is excited on the surface of the first cladding 24a side in the metal film 71. The excited surface Plasmon is propagated downward on the metal film 71 and is converted to the near-field light R having the strong light intensity to the top portion 77 of the protrusion portion 76.

Thus, since it is possible to generate the near-field light R by the near-field light generating element 26 in the state of further approaching the main magnetic pole 33, the recording onto the disk D can be smoothly and accurately performed.

Fourth Embodiment

Figure 29:
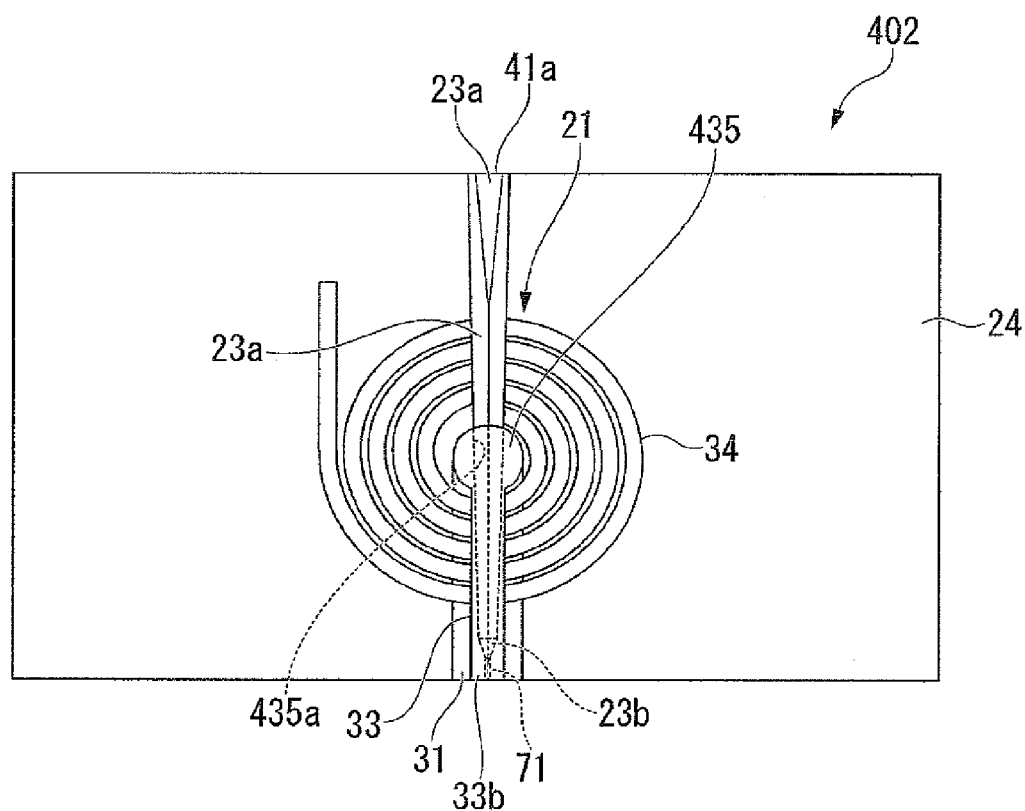
FIG. 29 is a diagram taken from a direction of an arrow J of FIG. 28.

Next, a fourth embodiment of the present invention will be described. FIG. 28 is an enlarged cross-sectional view of a side surface of an outflow end side of a recording and reproducing head in a fourth embodiment, and FIG. 29 is a view taken from a direction of an arrow J of FIG. 28. Furthermore, FIG. 30 is an enlarged cross-sectional view of a front side of the recording and reproducing head. In addition, in the description as below, the same configurations as those of the embodiments mentioned above are denoted by the same reference numerals, and the description thereof will be omitted.

As shown in FIGS. 28 to 30, a recording and reproducing head 402 of the present embodiment has the near-field light generating element 26 which is placed between the coil 34 in the recording element 21 and the main magnetic pole 33. The recording element 21 in the present embodiment includes an return pole 31 and a coil 34 molded in the first cladding 24a, a main magnetic pole 33 molded in the second cladding 24b, and a yoke 435 displaced between the return pole 31 and the main magnetic pole 33.

The return pole 31 is placed on the reproducing element 22 and is connect to one end side of the yoke 435 extended along the X direction. The coil 34 is formed in a spiral shape around yoke 435 centered on the yoke 435. Furthermore, the yoke 435 is formed with a though hole 435a penetrating in the Z direction, and the core 223 is placed so as to penetrate though the through hole 435a. Moreover, the main magnetic pole 33 is connected to the lower end (the opposite side of the return pole 31 with the core 223 interposed therebetween) of the yoke 435.

The tip portion 33b of the main magnetic pole 33 is placed so as to cover the lower end surface (for example, the side surface 23d of the first core 23) of the core 223. That is, the tip portion 33b of the main magnetic pole 33 of the present embodiment also serves as the same role as the light shielding film 27 (see FIG. 7) mentioned above.

However, when the disk D is rotated as mentioned above, if the recording and reproducing head 2 receives force floating by the convex portion 20b, the recording and reproducing head floats to a position separated from the disk D by a predetermined distance H (see FIG. 5). At this time, a posture of the slider 20 upon floating will be described in more detail. The slider 20 is not horizontal to the disk surface D1 but is slightly inclined. Specifically, in a state where the outflow end side of the slider 20 is closest to the disk D, the slider 20 is inclined so that an angle formed between the disk surface D1 and the ABS 20c of the slider 20 maintains a small angle.

Thus, according to the present embodiment, since it is possible to place the near-field light generating element 26 and the main magnetic pole 33 at the foremost end side in the slider 20, it is possible to generate the near-field light R due to the near-field light generating element 26 and the magnetic field due to the main magnetic pole 33 in the state of being closest to the disk D. As a result, it is possible to smoothly and accurately perform the recording on the disk D.

In addition, by constituting the main magnetic pole 33 by the material having the light shielding property as mentioned above, it is possible to suppress that the laser beam L incident to the core 223 leaks to the cladding 24 side without separately providing the light shielding film. For that reason, it is possible to promote a decline in manufacturing cost and an improvement in manufacturing efficiency.

In addition, the technical scope of the present invention is not limited to the respective embodiments mentioned above, various modifications added to the embodiments mentioned above are included within a scope not departing from the gist of the present invention. That is, the configurations or the like described in the embodiments mentioned above are merely an example and can be suitably changed.

For example, in the embodiments mentioned above, an air floating type information recording and reproducing device has been described as an example in which the recording and reproducing head is caused to float. However, the disk and the recording and reproducing head may come into contact with each other if those are oppositely placed on the disk surface without being limited to this case. That is, the recording and reproducing head of the present invention may be a contact slider type recording and reproducing head. Even in this case, the same effect can be achieved.

Furthermore, the respective embodiments may be suitably combined with each other.

Furthermore, in the embodiments mentioned above, a case has been described where the recording and reproducing head 2 of the present invention is adopted to a perpendicular recording and reproducing method of giving the recording magnetic field perpendicular to the disk D. However, the recording and reproducing head 2 may be adopted to an in-plane recording method of giving the recording magnetic field horizontal to the disk D, without being limited thereto.

Furthermore, a method of forming the remaining portion 160 of the core 23 in the first patterning process mentioned above has been described, but all of the core 23 other than the forming region of the core 23 may be removed without leaving the remaining portion 160.

Furthermore, in the embodiments mentioned above, the core 23 is configured by two layers of the first core 223a and the second core 223b, but the core 23 may be configured by three layers or more, without being limited thereto.

Furthermore, the protrusion portion 76 having the top portion 77 over the whole region of the Z direction of the extending portion 73 in the metal film 71 has been formed, but the forming region of the protrusion portion 76 in the Z direction may be suitably changed in design, if the top portion 77 is exposed to the outside, without being limited thereto.

Figure 31:
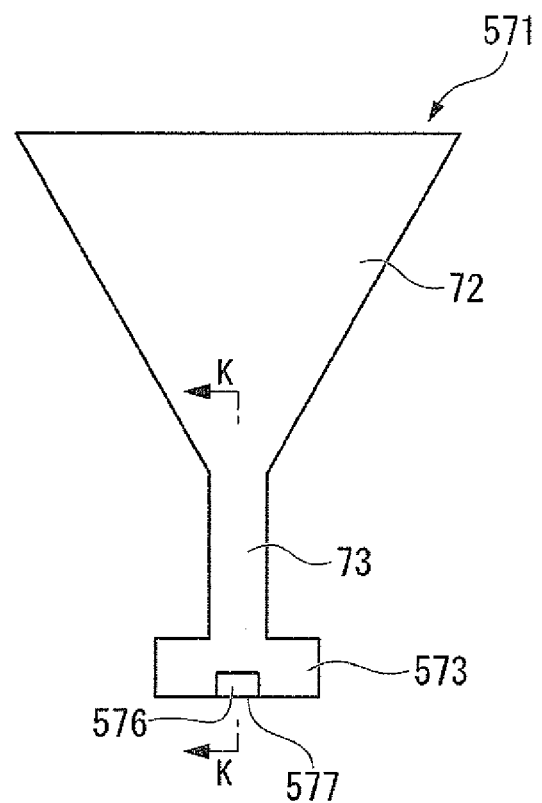
FIG. 31 is a plan view showing another configuration of the metal film.
Figure 32:
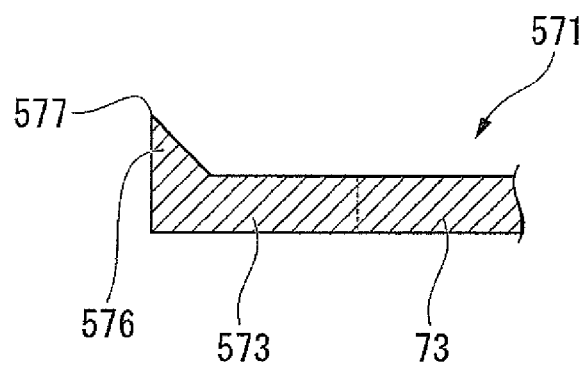
FIG. 32 is a cross-sectional view along a line K-K of FIG. 31.

Furthermore, like the metal film 571 shown in FIGS. 31 and 32, a wide-with portion 573 formed to be wider than the extending portion 73 along the Y direction may be formed in the lower end portion of the extending portion 73, and a protrusion portion 576 having a top portion 577 may be formed in the lower end portion of the wide-width portion 573.

Furthermore, in the near-field light generating element 26 (see FIG. 6 or the like) in the embodiment mentioned above, the metal film 71 has been formed so as to overlap with only the near field light generating portion 23b in the core 23 in the Z direction. However, the forming range of the metal film 71 is not limited thereto, if at least the top portion 77 is exposed to the outside. For example, the metal film 71 may be formed over the whole region (the light flux focusing portion 23a and the near field light generating portion 23b) of the core 23 in the Z direction.

However, if the metal film 71 is also formed in a region overlapping with the light flux focusing portion 23a, the laser beam L propagated through the light flux focusing portion 23a is absorbed by the metal film 71 and becomes loss, whereby the propagation efficiency of the laser beam L may fall. On the contrary, like the embodiments mentioned above, by forming the metal film 71 only in a region corresponding to the near field light generating portion 23b, it is possible to propagate the laser beam L between the core 23 and the cladding 24 by the total reflection condition up to the near field light generating portion 23b. For that reason, more of the laser beam L can be led to the near field light generating portion 23b, whereby the propagation efficiency of the laser beam L can be improved.

Figure 33:
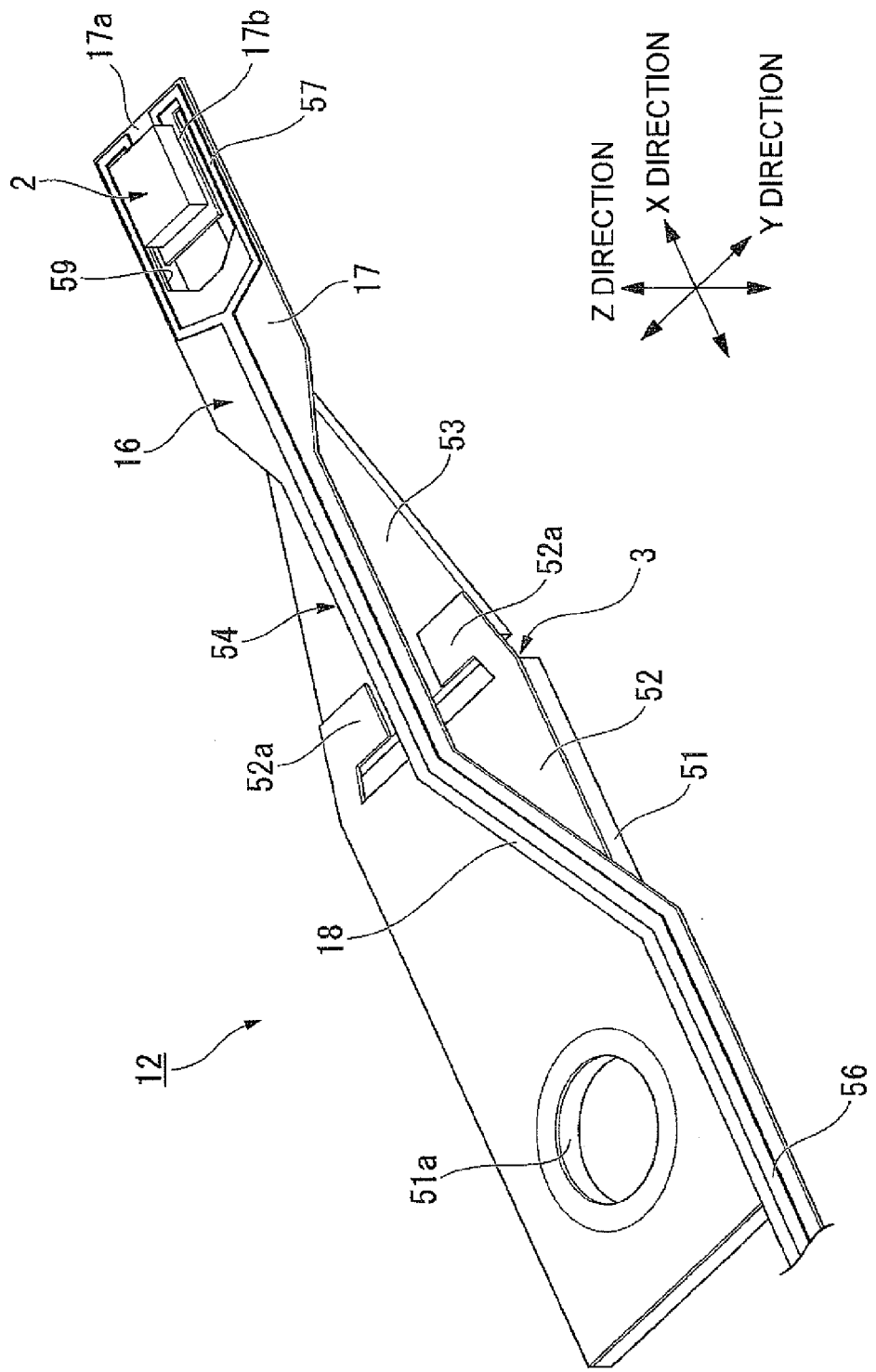
FIG. 33 is a perspective view in which a suspension according to another configuration of the present embodiment is viewed from the recording and reproducing head side.

Furthermore, in the embodiments mentioned above, as shown in FIGS. 2 and 3, a configuration has been described in which the electric wiring 56 is branched into two first electric wiring 57 for supplying the reproducing element 22 and the recording element 21 with electric current and a second electric wiring 58 for supplying the laser beam source 29 with the electric current, but the present invention is not limited thereto. For example, as shown in FIG. 33, an electric wiring for supplying the laser beam source 29 with the electric current may be provided in the first electric wiring 57, without providing the second electric wiring 58.

According to the configuration, since there is no need to provide the second electric wiring 58 which bridges between the pad portion 17b and the gimbal 17, it is possible to improve a degree of freedom of a flexural deformation of the pad portion 17b to the gimbal 17.

What is claimed is:

1. A near-field light generating element which propagates a light flux introduced to one end side while focusing the light flux toward the other end side, and emits a near-field light to an outside after generating the near-field light from the light flux, the element comprising:
    a first core that propagates the light flux toward the other end side; and
    a near-field light generating portion which is placed along a propagation direction of the light flux from the one end side toward the other end side in the first core, and generates the near-field light from the light flux,
    wherein the near-field light generating portion has
    a base portion placed on one side surface of the first core along the propagation direction, and
    an extending portion extended from the base portion toward the other end side along the propagation direction rather than the first core,
    the other end side of the extending portion is exposed to the outside, and has a top portion projected toward a direction intersecting to a plane direction of the one side surface of the first core, and
    wherein an end surface of the first core situated at the other end side is inclined so that an angle formed between the end surface and the one side surface becomes an acute angle.

2. The near-field light generating element according to claim 1, further comprising:
    a second core which covers the first core at an opposite side of the near-field light generating portion with respect to the first core,
    wherein an outer end portion of the second core is situated at the outside than that of the base portion in an extending direction of an interface between the second core and the base portion when viewed from the propagation direction.

3. The near-field light generating element according to claim 2,
    wherein the second core has a refractive index smaller than that of the first core.

4. The near-field light generating element according to claims 1,
    wherein a third core having a refractive index smaller than that of the first core is provided between the one side surface of the first core and the near-field light generating portion.

5. The near-field light generating element according to claims 1,
    wherein a light shielding film is formed at an opposite side of the near-field light generating portion with respect to the first core.

6. The near-field light generating element according to claims 1,
    wherein the top portion is projected toward the first core side when viewed from the propagation direction.

7. The near-field light generating element according to claim 1, further comprising:
    a cladding which covers the near-field light generating portion at the opposite side of the first core with respect to the near-field light generating portion and has a refractive index smaller than that of the first core,
    wherein the top portion is projected toward the cladding side when viewed from the propagation direction.

8. A near-field light head which heats a magnetic recording medium rotating in a certain direction and causes a magnetization inversion by applying a recording magnetic field to the magnetic recording medium to record information, the head comprising:
    a slider placed opposite to a surface of the magnetic recording medium; and
    a recording element which is placed at a tip side of the slider and has a main magnetic pole and an return pole generating the recording magnetic field;
    a near-field light generating element according to claim 1 which is fixed adjacently to the recording element in the state of causing the other end side to face the magnetic recording medium side; and
    light flux introduction device which is fixed to the slider to introduce the light flux from the one end side into the first core.

9. The near-field light head according to claim 8,
    wherein the main magnetic pole is formed of a material having light shielding property and is placed at an opposite side of the near-field light generating portion with respect to the first core.

10. An information recording and reproducing device comprising:
    a near-field light head according to claim 8;
    a beam which can be moved in a direction parallel to a surface of the magnetic recording medium and supports the near-field light head at a tip side thereof in a state of being freely rotatable around two axes parallel and perpendicular to each other to the surface of the magnetic recording medium;
    a light source which causes the light flux to be incident to the light flux introduction device;
    an actuator which supports a proximal end side of the beam and moves the beam toward a direction parallel to the surface of the magnetic recording medium;
    a rotation driving portion which rotates the magnetic recording medium in a certain direction; and
    a control portion which controls operations of the recording element and the light source.

* * * * *